United States Patent [19]

Ohtaki et al.

[11] 4,127,325
[45] Nov. 28, 1978

[54] AUTOMATIC EXPOSURE CONTROL CAMERA

[75] Inventors: Shohei Ohtaki, Yokohama; Tokuichi Tsunekawa, Yokohama; Zenzo Nakamura, Urawa; Takashi Uchiyama, Yokohama, all of Japan

[73] Assignee: Canon Kabushiki Kaisha, Tokyo, Japan

[21] Appl. No.: 615,897

[22] Filed: Sep. 23, 1975

[30] Foreign Application Priority Data

| Sep. 26, 1974 | [JP] | Japan | 49-111289 |
| Sep. 26, 1974 | [JP] | Japan | 49-111290 |
| Sep. 26, 1974 | [JP] | Japan | 49-111291 |
| Sep. 26, 1974 | [JP] | Japan | 49-111292 |
| Sep. 26, 1974 | [JP] | Japan | 49-111293 |
| Sep. 26, 1974 | [JP] | Japan | 49-111294 |
| Oct. 24, 1974 | [JP] | Japan | 49-122802 |
| Sep. 26, 1974 | [JP] | Japan | 49-111303 |

[51] Int. Cl.² .............. G03B 15/05; G03B 7/08; G03B 7/16; G03B 7/20
[52] U.S. Cl. .............. 354/32; 354/43; 354/46; 354/50; 354/141; 354/156; 354/224; 354/237
[58] Field of Search .............. 354/31, 32–34, 354/35, 27, 40, 46, 50, 51, 60 R, 60 L, 60 F, 127–129, 139, 149, 271, 273, 42, 43, 156, 224, 225, 237–239, 289, 126, 141

[56] References Cited

U.S. PATENT DOCUMENTS

| 3,699,858 | 10/1972 | Ogiso et al. | 354/33 |
| 3,760,699 | 10/1973 | Tsujimoto | 354/34 |
| 3,762,286 | 10/1973 | Hasegawa | 354/31 |
| 3,779,142 | 12/1973 | Yata et al. | 354/32 X |
| 3,805,278 | 4/1974 | Matsuzaki et al. | 354/50 X |
| 3,846,806 | 11/1974 | Yata et al. | 354/31 |
| 3,896,462 | 7/1975 | Taguchi et al. | 354/46 |

*Primary Examiner*—L. T. Hix
*Assistant Examiner*—William B. Perkey
*Attorney, Agent, or Firm*—Toren, McGeady and Stanger

[57] ABSTRACT

A self-adjusting electronic flash is attached to an interchangeable lens camera having a shutter-priority exposure control. For flash operation, aperture information suitable for electronic flash and the film sensitivity is automatically conveyed to the camera's diaphragm control. Thus the aperture can be automatically adjusted for flash as well as daylight operation.

9 Claims, 21 Drawing Figures

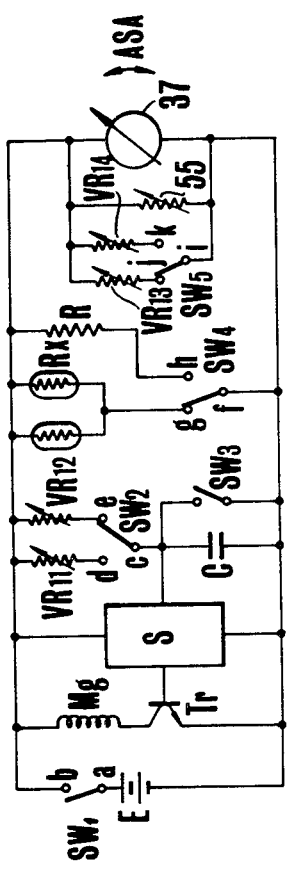
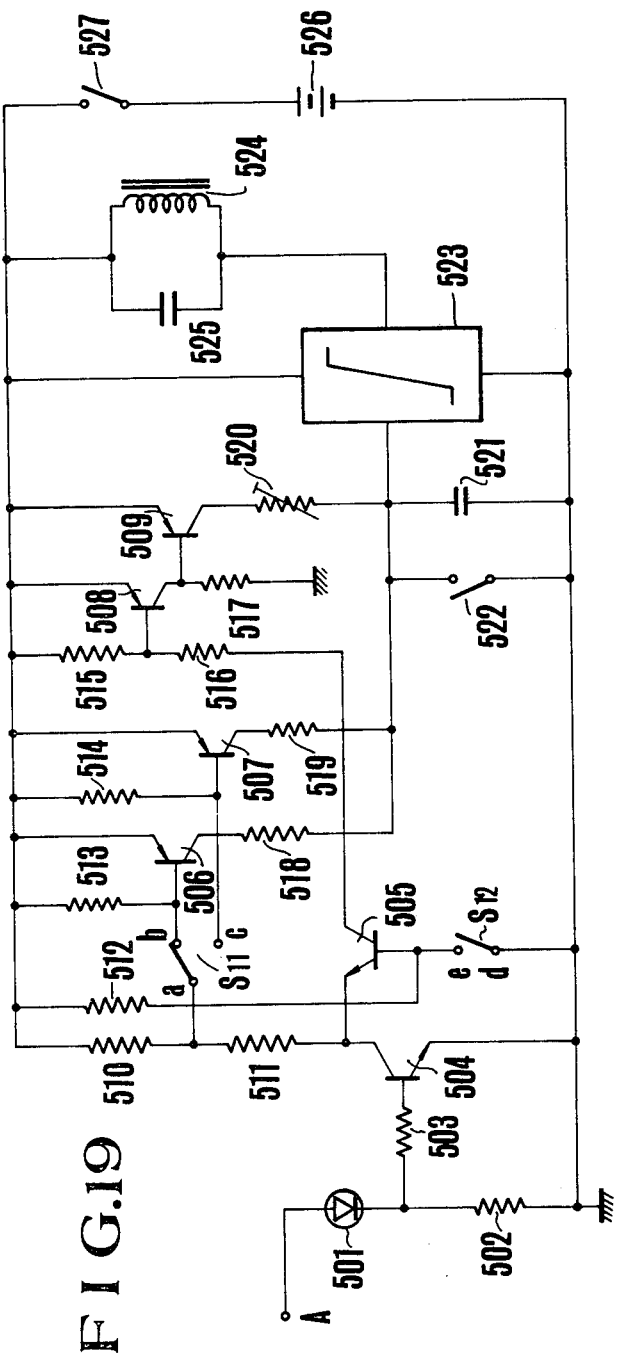
FIG.18
FIG.19

AUTOMATIC EXPOSURE CONTROL CAMERA

BACKGROUND OF THE INVENTION

1. Field of the Invention

This invention relates to photographic cameras with controls that automatically adjust the camera aperture during daylight or available light operation as well as when the camera operates with a flash unit.

2. Description of the Prior Art

In known camera-flash systems, a light control circuit automatically adjusts the light output of an automatic flash to produce a proper exposure for a specified aperture and a particular film sensitivity. Therefore, it is necessary to preset the diaphragm of an interchangeable lens at this specific aperture value for flash operation. Hitherto, it was necessary to preset the aperture of the interchangeable lens manually for automatic flash operation. Conventional cameras with automatic exposure controls cannot automatically be set for flash operation. Thus, photographers often forget to set the aperture of such cameras when operating with flash because they are accustomed to thinking of the camera as having an automatic exposure control.

In order to make an interchangeable lens camera automatic under all types of conditions, it is necessary to enter certain information. For example, in automatic exposure control cameras having diaphragm controls with shutter priority and a totally open light measuring system, it is necessary to enter the film sensitivity, the shutter speed, and the maximum F value of the lens being used, into the diaphragm control. Of the above, the film sensitivity must be entered into the diaphragm control even when operating within an electronic flash that adjusts its light automatically.

It is an object of the invention to improve cameras of this type. It is another object of the invention to overcome these problems.

SUMMARY OF THE INVENTION

According to a feature of the invention an interchangeable-lens SLR camera having automatic shutter and diaphragm controls, includes compensating means for generating a signal corresponding to the maximum aperture of the interchangeable lens being used to set it for the predetermined value needed for flash. A selector alternately changes the operation from an automatic daylight mode to a flash mode at which the lens is set to the compensated value and the shutter is set for flash operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 18 illustrates an electrical circuit diagram of the camera shown in FIG. 17.

FIG. 19 illustrates an electrical shutter control circuit embodying features of the present invention for use with cameras in accordance with the present invention.

DESCRIPTION OF PREFERRED EMBODIMENTS

Figure 1:
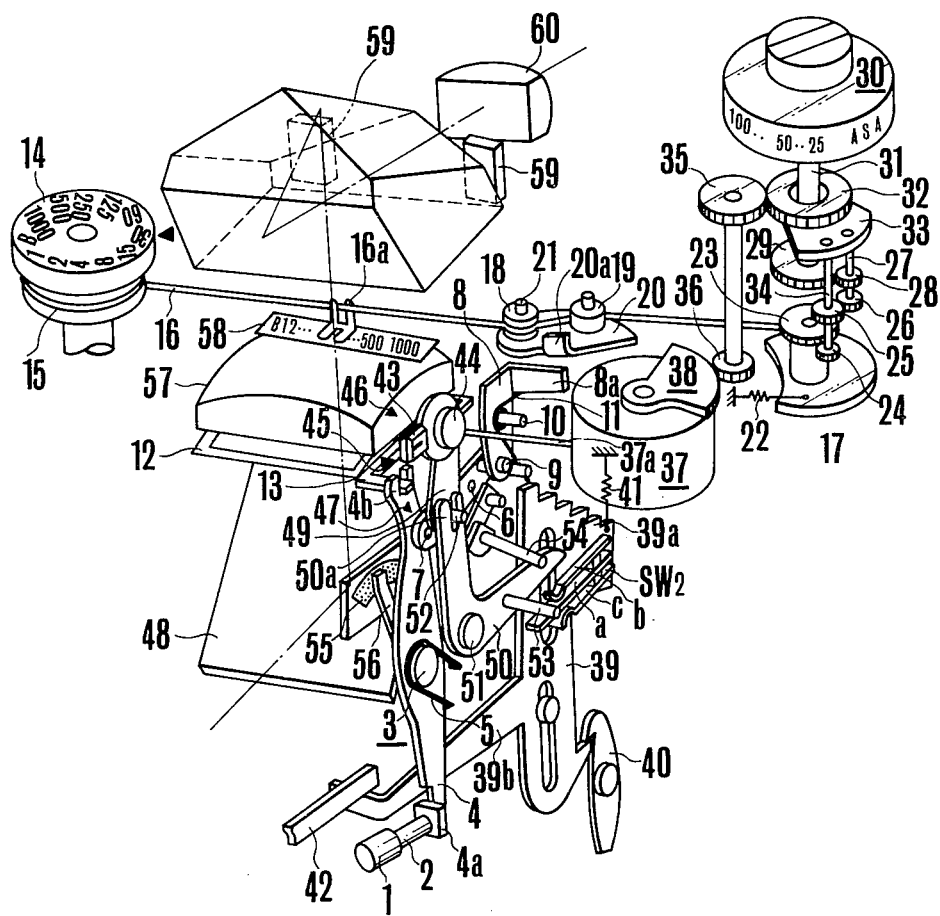
FIG. 1 is an exploded perspective view of a portion of a camera embodying features of the invention.

In FIG. 1, a pin 1 projects from the rear of an interchangeable photographic lens not shown in the drawing. The length of the pin 1 along the optical axis represents the maximum aperture value, i.e, the widest F stop (Avo) of the lens being used and serves to provide compensating data (Avc). A pin 2 extends from a bent end 4a of an engagement arm 4 rotatably pivoted on the fixed frame of the camera by means of a pivot 3. The arm 4 and the pin 2 are located so that the pin 2 engages the pin 1 when the interchangeable photographic lens is mounted. A spring 5 biases the engagement arm 4 clockwise. A pin 7 rotatably pivots a link lever 6 at the other end of the arm 4. The pin 9 at the end of the link lever 6 rotatably moves a transmission lever 8. The latter is pivoted on the camera frame by means of a pin 10. A spring 11 biases the lever 8 counterclockwise.

A bifurcated end 4b of the engagement arm 4 engages an aperture scale plate slidable on a focus plane 12 relative to which the scale plate 13 is movable.

A shutter speed dial 14 has an upper face displaying shutter speed graduations. A pulley 15 on the shaft of the dial 14 is integral with the shaft. A link chain or cord 16 has one end which is fixed to the wind-up pulley 17 and another end which is wound around the pulley 15. The chain 16 carries a speed indicating member 16a. A compensating lever 20 rotatably supports two guide rollers 18 and 19. A pivot 21 of the roller 18 is pivoted on the fixed frame of the camera so that the compensating lever 20 is rotatable about the pivot 21. A bent-up part 20a of the compensating lever 20 is engageable with the bent end 8a of the transmission lever 8. A spring 22 biases a wind-up pulley 17 to tense the link chain 16. A gear 23 integral with or keyed to the shaft of a wind-up pulley 17 engages a reduction gear 24. A shaft is integral with or keyed to with the gear 24 and a gear 25 which engages a reduction gear 26. The gear 26 is mounted on a shaft 27 which is integral with or keyed to a gear 28 which engages a gear 29. The gear 29 is fixed onto a rotary shaft 31 of a film sensitivity dial (hereinafter called the ASA dial).

A gear 32 is rotatable about the shaft 31 and carries a gear holding plate 33 which is fixed thereto. The holding plate 33 carries the shafts 27 and 34. When the ASA dial is rotated, the gear 29 rotates so that the rotation is transmitted to the pulley 17 through the gears 28, 26, 25, and 24. At the same time, the gear 23 on the pulley remains stationary so that the gear 24 rotates about the gear 23. This turns the holding plate 33 and the gear 32. The gear 32 drives a gear 35 which is keyed to a gear 36 that engages a sector gear 38 keyed or fixed to the body of an exposure meter 37.

Rotation of the shutter speed dial 14 rotates the pulley 15 which drives the pulley 17 through the chain 16. This rotates the body of the meter 37 through the gears 23, 24, 25, 26, 33, 35, and 36 so as to enter the shutter speed into the meter.

A lever or slide plate 39 is provided with sawteeth 39a at one end. Its other end engages a hook claw 40. A spring 41 biases the slide plate 39 upwardly. An arm portion 39b on the lever 39 is engageable with a lever 42 fixed on the diaphragm preset ring (not shown in the drawing) of the interchangeable photographic lens.

A mirror lifting lever 43 is rotatably attached on a pivot 44 fixed on the frame of the camera body. The lever 43 is turned to an index 45 on the camera body for taking a photograph in daylight, to an index 46 to lift the mirror 48 manually, and to an index 47 on the camera body for taking a flash photograph. A lever 49 keyed to the mirror lifting lever 43 is rotatably pivoted on the pivot 44. A lever 50 has a bifurcated end 50 which engages the pin 52 on the lever 49. The other end of the pin 53 opens and closes a switch $SW_2$. A pin 54 on one side of the mirror 48 is engageable with the lever when the mirror lifting lever 43 coincides with the index 46.

A resistance 55 has its value set by means of a slide member 56 carried by the lever 4 so as to transmit data Svo concerning the lens aperture value required by the automatic electronic flash, the maximum aperture F value (Avo) and the compensating signal (Avc).

A condenser lens 57 is provided on the focus plate 12. A shutter speed indicating plate 58 is provided over the lens 57 so as to be visible through the viewfinder. A light sensing element 59, such as one composed of Cds, a photoresistor, etc., is positioned to intersect the path of light coming from the object to be photographed. An eyepiece lens 60 is positioned behind the light sensing element.

Figure 2:
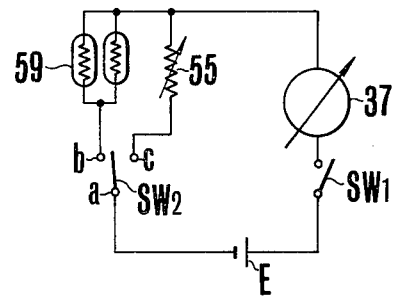
FIG. 2 is a circuit diagram illustrating a control circuit of the camera shown in FIG. 1.

The diaphragm control circuit of the camera in FIG. 1 appears in FIG. 2. Here a main switch $SW_1$ passes current from a current source E through the meter 37 and either the photoresistor 59 or the resistor 55 depending upon whether the armature a of the switch $SW_2$ contacts the terminal b or the terminal c.

In operation, when the camera is to be used for daylight photography and an interchangeable F = 1.4 lens is mounted on the camera the pin 1 of the lens moves the pin 2 and the engagement arm 4 to shift the aperture scale plate 13. This moves the figure F = 1.4 on the scale plate 13 to the end of the frame not shown in the drawing. At the same time, the pin 9 rotates the transmission lever 8 clockwise against the force of the spring 11 so that the compensating lever 20 turns counter-clockwise and bends the link chain 16. This rotates the windup pulley 17 which in turn causes the reduction gear group to rotate the body of the meter 37. In this way, compensation data (Avc) of the interchangeable lens is entered in the meter 37.

For daylight operation, the lifting lever 43 is set to the index 45. Hence the armature a of the transfer switch $SW_2$ is connected to the terminal b. Thus the light sensing element 59 is connected to the meter 37 and the needle 37a of the meter indicates the light intensity of the beam from the object to be photographed at the maximum aperture F stop. When the shutter speed is set by means of the shutter speed dial 14, the link chain 16 rotates the pulley 17 further, thereby rotating the meter body 37 further. When the sensitivity of the film to be used is set at the ASA dial 30, the aforementioned gear group rotates in accordance with the sensitivity of the film to be used so as to rotate the meter body 37 further. Thus the needle 37a of the meter 37 indicates the proper aperture value corresponding to the shutter speed, the sensitivity of the film, Avc information as well as the brightness of the object to be photographed. In accordance, it is possible for the photographer to read the proper exposure value from the aperture scale plate 13 and the needle 37a.

When the shutter button, not shown in the drawing, is pushed, the hook claw 40 is disengaged from the slide plate 39. Thus the plate 39 moves up so as to move the lever 42 provided on the diaphragm preset ring. The lever 42 moves until the saw teeth 39a of the lever engage the needle 37a of the meter 37. In this way, the lever 42 rotates an amount corresponding to the proper aperture value indicated by the needle 37a of the meter 37.

When the shutter button is further depressed the diaphragm blades of the photographic lens are closed down to the position of the lever 42 in the conventional way to set the photographic lens at the proper aperture value while the mirror 48 is raised in the conventional manner, the shutter is opened and the exposure starts. Then after the elapse of a given time, the shutter not shown in the drawing is closed in the conventional manner and the exposure is completed. This automatically sets the aperture for taking a daylight photograph.

For flash operation, an automatic light adjusting electronic flash unit is mounted on the camera. The shutter speed as well as the film sensitivity is set in the same manner as for daylight photography. The mirror lifting lever 43 is set at the index 47 in this photographic mode. The lever 49 rotates counterclockwise so as to rotate the lever 50 clockwise. The pin 53 switches the armature a of the switch $SW_2$ to the terminal c so as to connect the resistance 55 to the meter 37. The resistance 55 cancels the compensation hitherto introduced by the rotation of the meter 37. The resistance 55 also enters the aperture value Svo needed by the automatic light adjusting electronic flash unit and the Avo data concerning maximum aperture F stop of the photographic lens. The needle 37a of the meter 37 assumes a position corresponding to the sum of Svo and Avo. Thus the proper aperture value is indicated in the view finder by means of the needle 37a and the aperture scale plate 13.

The operation may be better understood if it is assumed that the aperture value or F stop required by the automatic electronic flash unit is 4, (F = 4). When an F = 1.4 photographic lens is mounted on the camera, the pin 1 rotates the arm 4 counterclockwise as explained above, so as to shift the aperture scale plate 13. Thus the indication F = 1.4 on the aperture scale plate 13 is translated to the end of the frame (not shown in the drawing) provided on the focus plate 12. At the same time, the pin 1 rotates the transmission lever 8 clockwise against the spring 11 and the compensating lever 20 counterclockwise, so that the link chain is bent. The windup pulley 17 now rotates while the meter body 37 is rotated by the reduction gear group. This transmits the compensation information Avc of the interchangeable lens to the meter 37. Setting of the shutter speed dial 14 and the film sensitivity dial 30 move the meter body 37 further as explained above in such a manner that the desired shutter speed as well as the desired film sensitivity is entered in the meter 37. The resistance 55 is connected to the meter 37 so that the deflection of the needle 37a of the meter 37 corresponds to the value of the resistance 55. On the other hand, the value of the resistance 55 corresponds to the aperture value (Svo) required for the automatic light adjusting speed light device, the maximum F stop data Avo of the photographic lens and the compensation data Avc of the lens. The portion of the meter deflection arising from the value of the resistance corresponding to Avc, is equal and opposite to the rotation of the meter 37 due to the compensation lever 20. Thus the needle 37a of the meter 37 indicates the aperture value F = 4 for a proper exposure corresponding to Svo and Avo.

The lens pin 1 for an F2 lens is longer than for an F1.4 lens. When an F2 lens is mounted on the camera the figure F = 2 on the aperture scale plate 13 is moved to the end of the frame (not shown in the drawing) provided on the focus plate 12. The value of the resistance 55 now assumes a value corresponding to the departure from the maximum aperture value F, so that the position of the needle 37a of the meter 37 increases by the difference ΔAvo from the maximum aperture value F. In this way, the needle 37a of the meter 37 indicates the aperture value F = 4 for the proper exposure even when an F2 lens is used. When then the shutter button is depressed the diaphragm of the photographic lens is adjusted in accordance with the position of the needle 37a of this metter in the same way as for daylight photography. The automatic light adjusting flash unit then operates to produce the proper exposure.

As explained above, during flash operation the maximum aperture value F is introduced in the diaphragm control circuit and the diaphragm is automatically set at the proper aperture value.

The aforementioned embodiment operates with interchangeable step number (or relative value) lenses, i.e. lenses with step number aperture adjustments. The following operates with absolute value lenses, i.e., lenses with absolute value aperture adjustments. The difference between these two arise because, generally speaking, a single reflex camera with interchangeable lenses and a TTL open light measuring system, requires a link lever for linking the lens diaphragm with the camera body. The link lever controls the diaphragm of the interchangeable lens in response to the measured light.

There are two types diaphragm link lever arrangements. In the first type, i.e. the arrangement of the step number lens, the starting position of the diaphragm link lever is the same regardless of the maximum aperture value F of the lens. In the second type, i.e., the absolute value lens, the starting position of the diaphragm link lever varies with the maximum aperture value F of the lens and always assumes the same position for a particular aperture value. Thus it is essential to alter the diaphragm control system in accordance with the type of lens. To control the diaphragm of a step number lens during daylight operation it is not necessary to add the maximum aperture value Avo because that value is already considered in the step number control itself. To control the diaphragm of a lens with an absolute value system during daylight operation, it is necessary to add the maximum aperture value Avo. Also, to control the diaphragm of the first and the second types of lenses the compensation (Avc) is needed, while to indicate the aperture value on the aperture scale, the maximum aperture value F (Avo) is needed. For flash operation it is necessary to enter the required aperture value and the maximum aperture value F in the diaphragm control circuit when using a step number lens, while it is necessary only to enter the required aperture value to the diaphragm control circuit when using an absolute value lens.

Figure 3:
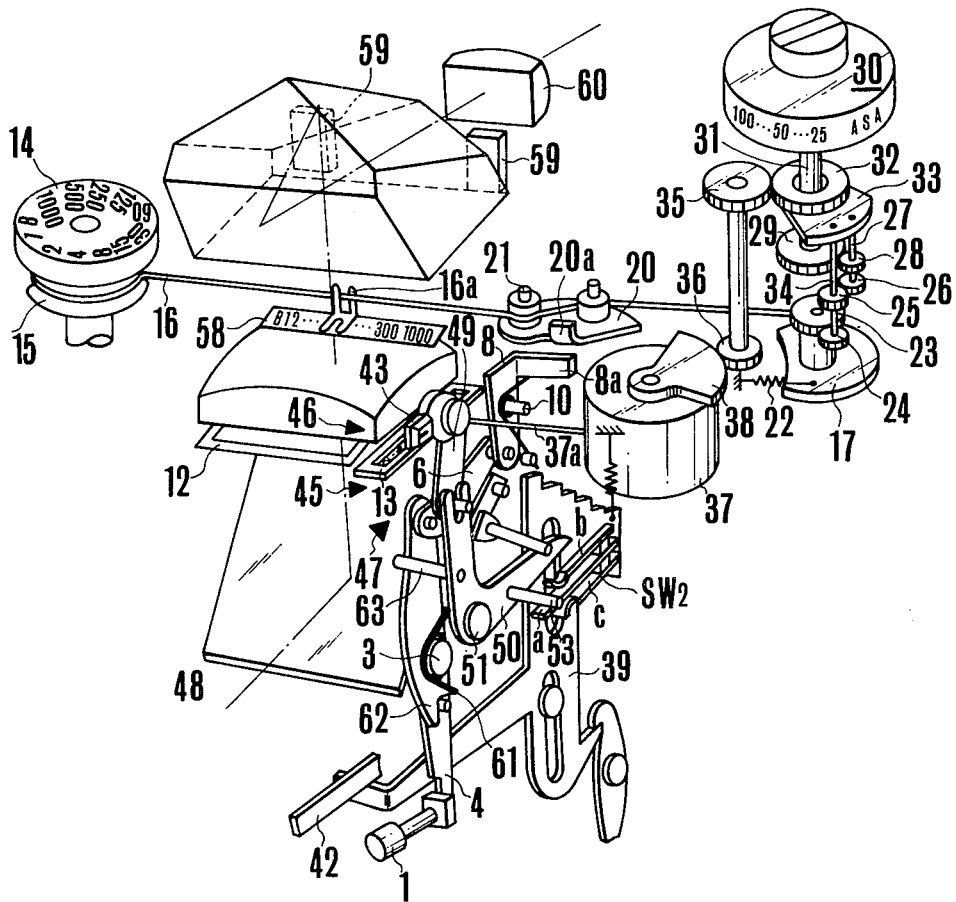
FIG. 3 is an exploded perspective of a variation of the camera shown in FIG. 1 and embodying features of the invention.
Figure 4:
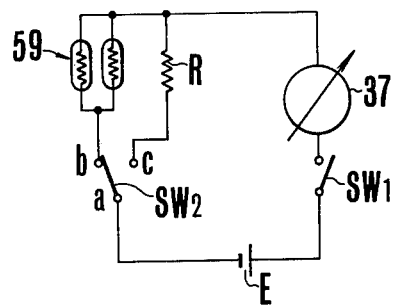
FIG. 4 is a circuit diagram of a control circuit for the camera shown in FIG. 3.

An absolute value lens is used with the camera of FIGS. 3 and 4. Here like elements are represented by the same reference numerals as in FIGS. 1 and 2. The camera of FIG. 3 is similar to that of FIG. 1, except that the engagement of the arm 4 with the aperture scale plate 13 as well as the resistance 55 are omitted.

When taking a daylight photograph the value Avo representing the maximum aperture value F and the compensation data Avc are transmitted to the lever 6 by the compensating pin 1 through levers 4 and 62. The latter are connected by a spring 61. The values Avo and Avc are further transmitted by clockwise rotation of the lever 8 around the center shaft 10. This rotation causes the portion 8a of the lever 8 to push the bent up portion 20a of the lever 20 so that the lever 20 rotates counterclockwise about the center shaft 21. The amount of the rotation is transmitted to the meter 37 through the gear 38 as explained with respect to FIG. 1 so as to enter the values Avo and Avc into the meter. At this time the indicating plate 13, on the focus plate 12 indicates the absolute value of the aperture. If the meter body 37 rotates on the basis of the Avo and Avc data, when a lens of different maximum aperture value F is mounted, the needle 37a of the meter 37 indicates the correct aperture value on the indication plate 13. When the release button (not shown in the drawing) is then pushed down the lever 42 is set by the sawteeth 39 as in FIG. 1.

For flash photography the lever 43 is set at index 47. This rotates the lever 49 counterclockwise and the lever 50 clockwise about the shaft 51. Thus the pin 63 on the lever 50 rotates the lever 62 clockwise around the shaft 3 against the force of the spring 6. The lever 6 now rotates the lever 8 counterclockwise. This disengages the part 8a of the lever 8 from the portion 20a of the lever 20. Thus the values Avo and Avc introduced by the compensation pin are not entered into the meter 37.

The rotation of the lever 50 causes the pin 53 to move the armature a of the switch SW$_2$ from contact a to contact c. Thus in FIG. 4 the resistance R is connected to the meter 37. The value of the resistance R is set at a value corresponding to the required aperture value Svo of the automatic electronic flash unit. Hence the needle 37a of the meter 37 indicates the aperture for a proper exposure. This imparts the right position to the lever 39. After that, in response to operation of the shutter button (not shown in the drawing), the position of the needle 37a is detected by the lever 39 so as to adjust the diaphragm of the photographic lens (not shown in the drawing) in the conventional manner for obtaining the proper exposure. The shutter button then actuates the automatic electronic flash unit.

In FIGS. 1 and 2, the mirror 48 is raised by the mirror lifting lever 43. When the mirror lifting lever 43 is set to the index 46, the lever 49 rotates clockwise so as to rotate the lever 50 counterclockwise. Thus the pin 54 is moved by the lever 50 and raises the mirror 48.

As explained above, and in accordance with the invention, with an interchangeable lens using the step number system the maximum aperture value Avo of the lens is entered into the diaphragm control circuit. Thus the aperture value can be adjusted both for available light and flash operation.

On the other hand, when the interchangeable lens employs the absolute value system the maximum aperture value of the lens is removed from the diaphragm control circuit during flash operation. Hence the aperture value can still be automatically adjusted both for daylight and flash operation.

As a result, the aforementioned compensation can be achieved by operating the mirror lifting lever, without providing any special facilities in the camera, while entering or taking the maximum aperture value into or from the diaphragm control circuit during flash operation. This permits a compact camera construction.

Another embodiment of the present invention is shown in FIGS. 5 to 8. Here the same members as those in FIG. 1 are designated by like reference characters.

Figure 5:
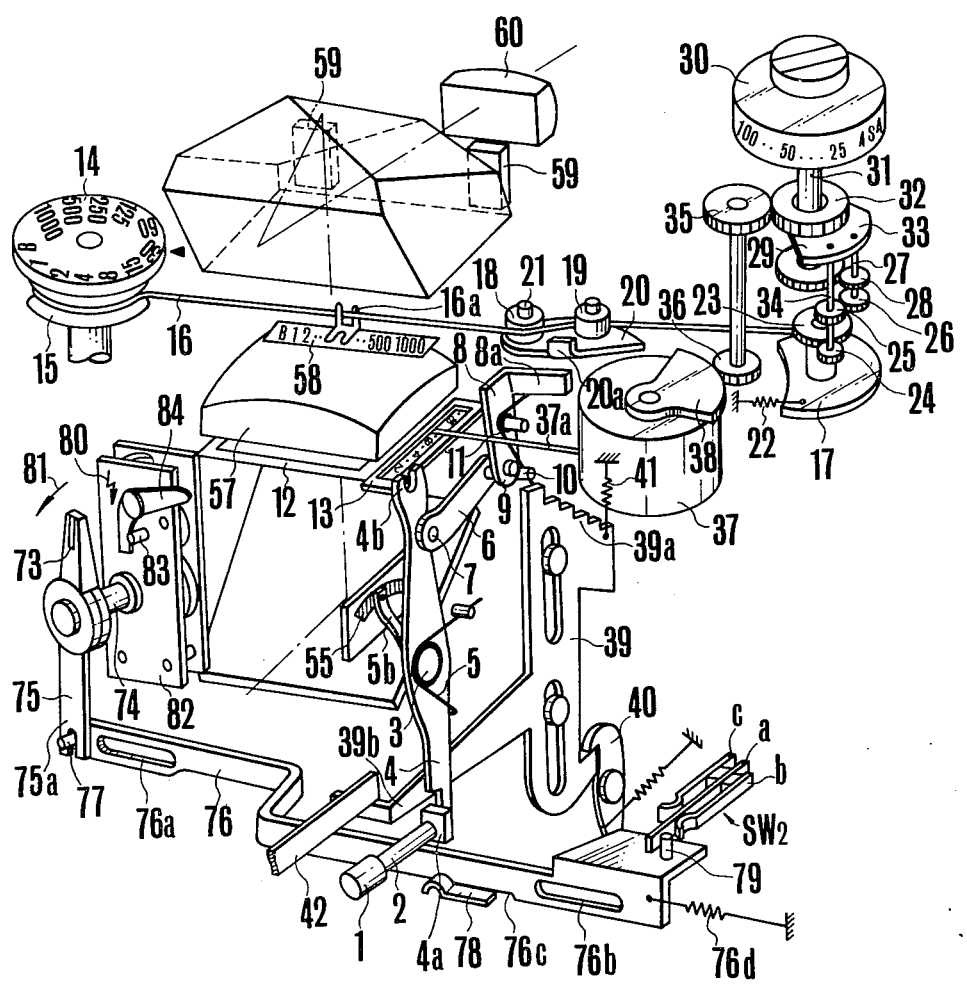
FIG. 5 is an exploded perspective view of a portion of another camera embodying features of the invention.

In FIG. 5, a self-timer operating lever is rotatably mounted on a shaft 74. A lever 75 is connected with the self-timer operating lever 73 by means of a one-way clutch not shown. A pin 77 on the lever 76 engages the end 75a of the lever 75. A spring 76d biases the lever 76 to the right and the latter is guided in its left and right motion by two guide slots 76a and 76b. A spring 78 engages a click groove on the lever 76. A pin 79 on the lever 76 opens and closes the switch $SW_2$.

The self-timing operating lever 73 is set to an index 80 for flash operation. An arrow 81 illustrates the direction along which the self-timer lever 73 moves during its use. The self-timer body 82 engages the lever 73 through the shaft 74 in such a manner that a spring not shown in the drawing is energized by moving the lever along the direction of the arrow. A starting lever 84 is operated in response to a release lever not shown so as to actuate a starting pin 83 and start the self-timer. The camera of FIG. 5 operates in conjunction with the diaphragm control circuit shown in FIG. 2.

The camera is used for daylight operation as follows. First an interchangeable lens, for example an F1.4 lens is mounted on the camera body. The pin 1 of the lens shifts the diaphragm scale plate 13 as in the previous embodiments. This moves the figure 1.4 on the scale plate 13 to the end of the frame (not shown) on the focus plate 12. At the same time, the compensating data Avc is entered in the meter body 37 by rotating it. While taking a photograph, the self-timer operating lever 73 is set to its vertical position so as to move the armature a of the switch $SW_2$ to the terminal b. This connects the light sensing element 59 to the meter 37. The output of the light sensing element now deflects the needle 37a of the meter 37 to a position corresponding to the amount of light from the object to be photographed, and to the lens' maximum aperture.

Setting the shutter speed to the desired value by means of the shutter speed dial 14, and setting the film sensitivity by means of the ASA dial 30, further rotates the meter body 37 in the same manner as in the previous embodiment. Thus the needle 37a of the meter indicates the proper aperture value corresponding to the shutter speed, the film sensitivity, the Avc data as well as the brightness of the object to be photographed. Hence, the photographer is in a position to read the correct aperture value from the aperture scale plate and the indication by the needle 37a.

When the shutter button (not shown) is depressed, the diaphragm blades are closed in accordance with the position of the lever, hence, set to the proper aperture on the basis of the mounted lens in the same way as in the previous embodiment. The mirror is lifted in the conventional manner and the shutter opened to start the exposure. The shutter not shown in the drawing closes after a predetermined time and a conventional manner to terminate the exposure.

The above concerns automatically setting the diaphragm for daylight operation. For flash operation an electronic flash is mounted on the camera and the shutter speed as well as the film sensitivity is set in the same manner as for daylight operation. When the self-timer operating lever 73 is first set to the index 80 in this mode, the lever 75 rotates clockwise so as to move the lever 76 to the right. The pin 9 now changes the armature a of the switch $SW_2$ from the terminal b to the terminal c. This connects the resistor 55 to the meter 37. As a result, the compensation information Avc previously entered into the rotation of the meter 37 is cancelled by the resistance of resistor 55. At the same time, the aperture value Svo established by the flash unit and the maximum aperture value Avo of the mounted lens is entered into the meter 37 by the resistor 55. In this manner, the needle 37a of the meter 37 assumes a position corresponding to the sum of Svo and Avo. Thus the viewfinder which displays the needle 37a and the aperture scale plate 13, indicates the proper aperture as in the previous embodiment.

Figure 6:
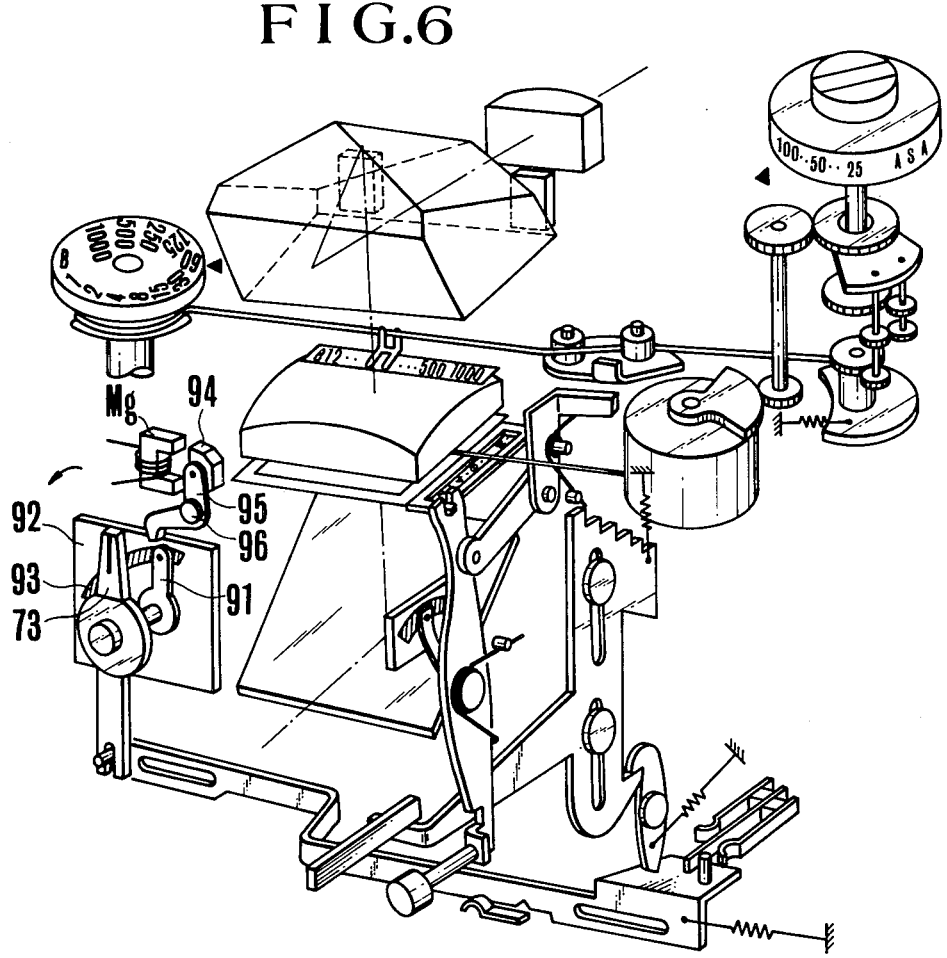
FIG. 6 is an exploded perspective view of a variation of the camera shown in FIG. 5 and embodying features of the invention.
Figure 7:
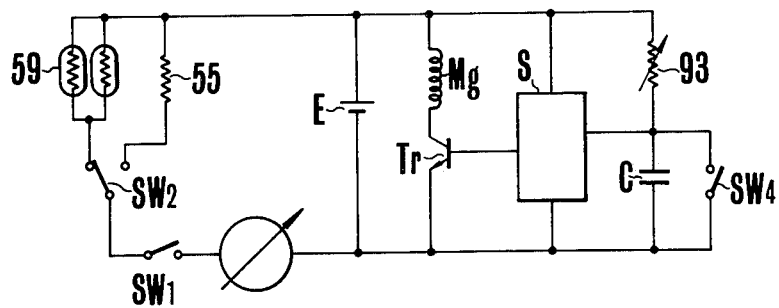
FIG. 7 is an electrical circuit diagram illustrating a portion of the camera in FIG. 6.

FIG. 6 illustrates an embodiment using an electronic self-timer instead of a mechanical self-timer. FIG. 7 shows the electrical circuit used in the embodiment of FIG. 6. This embodiment operates as follows. When the self-timer operating lever 73 is moved in the direction of the arrow, the brush 91 moves along the resistance 93 on the base plate 92. In this way, the desired self-timing is set at the resistance 93. When the switch $SW_1$ in FIG. 7 is now closed and the switch $SW_4$ is opened by the shutter release button, the capacitor 7 begins to charge through the resistance 93. After a time corresponding to the time constant of the capacitor and the resistor, the switching circuit S turns on the transistor Tr. An electric current now runs through the magnet Mg which attracts the contact piece 94. This rotates the lever 95 counterclockwise around the shaft 96 and disengages the hook of the front shutter curtain not shown.

The operation of the exposure control mechanism when taking a daylight photograph and when operating the self-timer, and the operation when taking a flash photograph are the same as those shown in the embodiment of FIG. 5.

Figure 8:
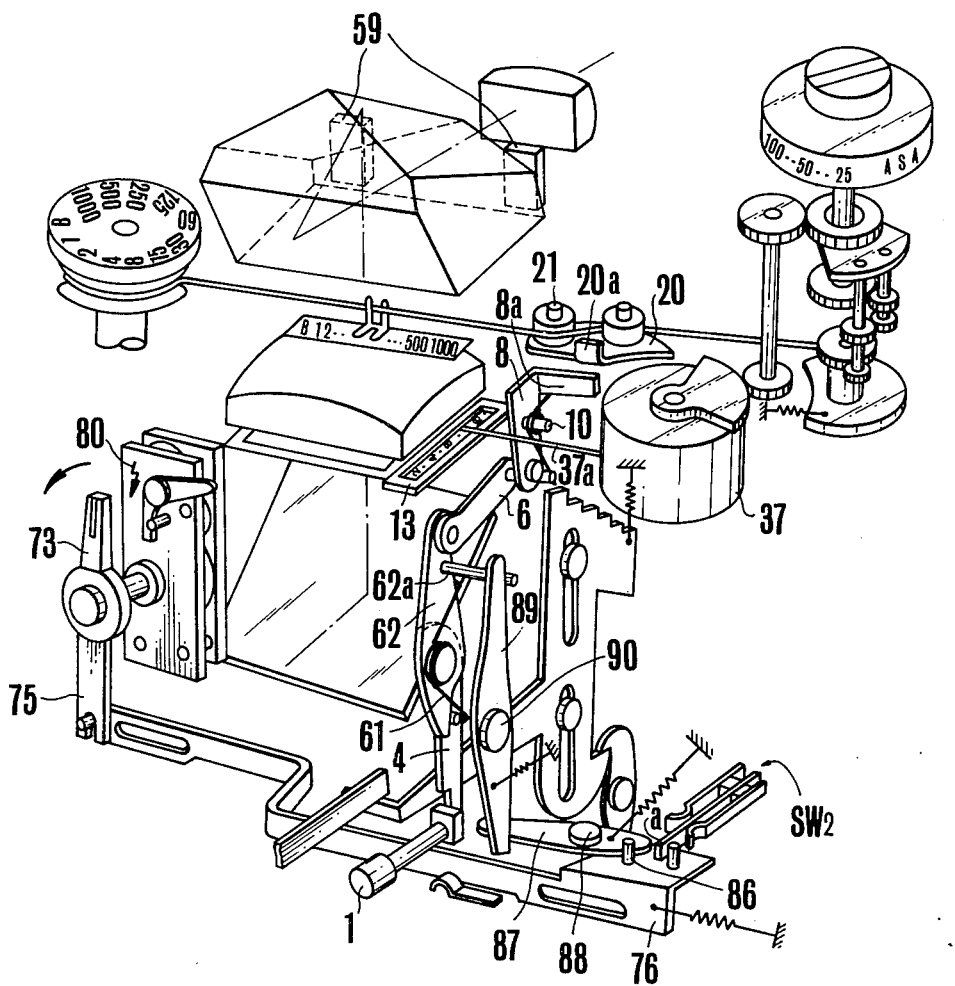
FIG. 8 is an exploded view showing another variation of the camera shown in FIG. 5 and embodying features of the invention.

When an absolute value lens is used with the cameras of FIGS. 4 and 8, the system operates as follows. When taking an available light photograph, the data Avo and Avc are entered in the meter 37 by the pin 1 in the same way as in the embodiment of FIG. 3. On the other hand, the absolute value of the aperture is indicated on the aperture scale plate 13 while the Avo data is introduced to the meter. Hence, the needle 37a and the aperture scale plate 37 display the correct aperture value.

When the self-timer operating lever 73 is set to the position 80 marked with the zig-zag arrow to take a flash photograph, the lever 76 is moved to the left by the lever 75. The pin 86 on the lever 76 now pushes the lever 87 and rotates it counterclockwise around a shaft 88. This rotates a lever 89 clockwise around a shaft 90. Thus, the pin 62a on the lever 62 rotates the lever 62 clockwise against the force of the spring 61. The lever 6 now rotates the lever 8 counterclockwise around the shaft 10. The end 8a of the lever 8 is disengaged from the end 20a and allows the lever 20 to assume a position independent of the rotation of the lever 8. This withdraws the values Avo and Avc from the meter 37.

When the lever 76 is moved to the left, the pin 86 pushes the armature a of the switch $SW_2$ to contact the terminal c. This connects the resistance R representing the aperture value Svo of the electronic flash unit so that the needle 37a of the meter 37 assumes the aperture position, for example, F=4, required by the automatic flash unit and applies the correct position to the aperture scale plate 13. The operation after this is the same as that for taking a picture with an interchangeable lens having a step number system.

Figure 9:
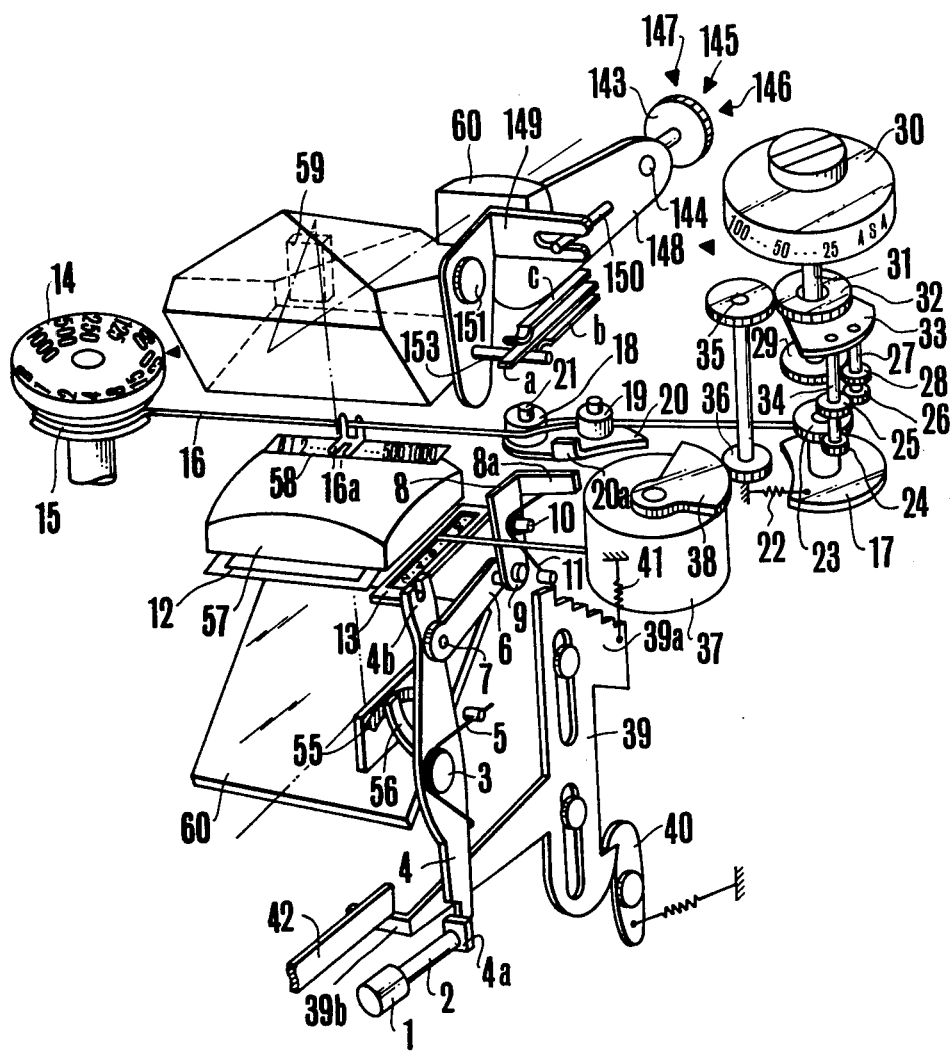
FIG. 9 is an exploded perspective view of a portion of a camera also embodying features of the present invention.
Figure 10:
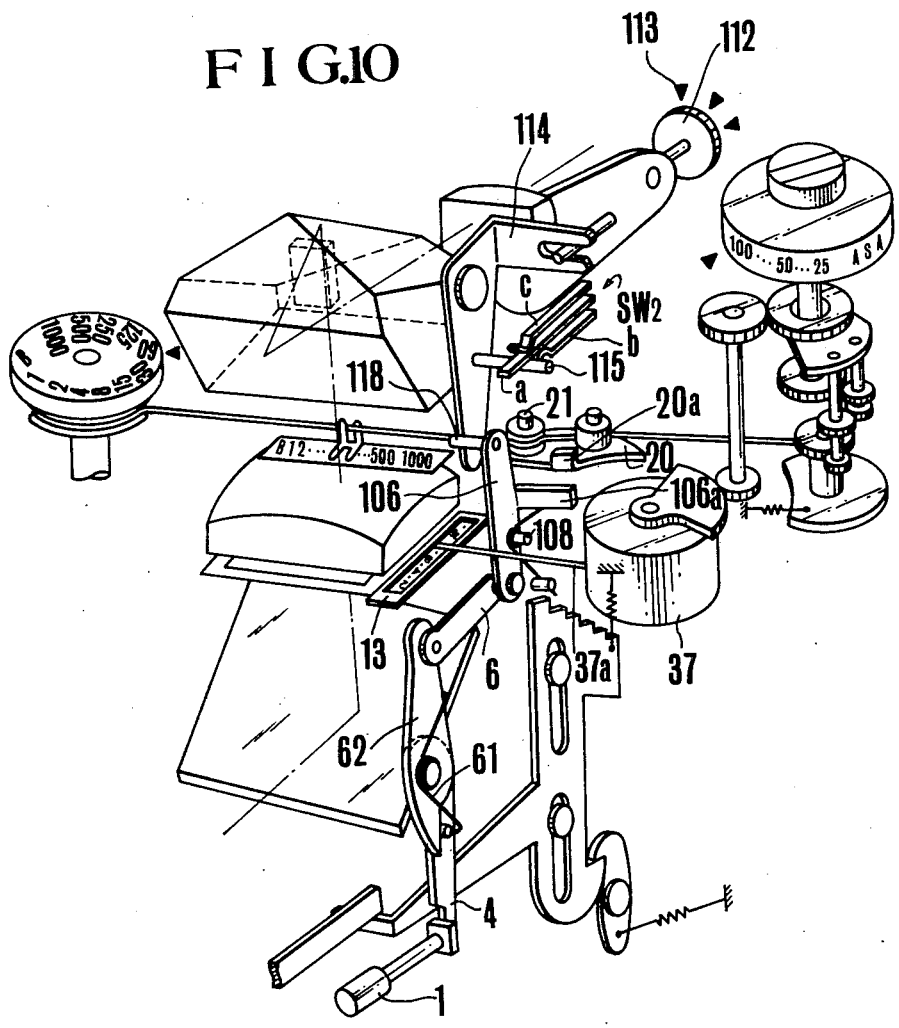
FIG. 10 is a variation of the camera shown in FIG. 9.

Another embodiment of the present invention is illustrated in FIGS. 9 and 10. Reference characters corresponding to those shown in FIG. 1 represent like structures. In FIG. 9, a shutter control knob on a shaft passing through the camera body is rotatable so that a mark on the knob can align with one of three indices 145, 146, and 147. Of the three indices, all of which appear on the camera body, the index 145 indicates that the camera is set for daylight operation. The index 146 is used for setting the eyepiece shutter 148. The mark on the knob 143 is set to the index 147 for flash operation.

A lever 149 engages a pin 150 on the eyepiece shutter 148. A shaft 151 rotatably holds the lever 149 which carries a pin 153 for opening and closing the switch $SW_2$.

The circuitry structure of FIG. 9 utilizes the circuit shown in FIG. 2.

For daylight operation, the mark on the knob 143 is set to the index 145. Hence the armature a of the switch $SW_2$ is connected to the terminal b. This connects the meter 37 to the light sensing element 59. The needle 37a of the meter 37 responds to the light sensing element 59 and indicates an amplitude corresponding to the amount of light from the object to be photographed, the maximum aperture value, etc.

For flash operation, the knob 143 is set to index 147. This rotates the lever 149 clockwise and causes the pin 153 to connect the armature a of the switch $SW_2$ to the terminal c. This connects the resistance 55 to the meter 37. The value of the resistance 55 cancels the compensation value Avc which has already been introduced to the meter 37 by rotating it. The resistance 55 also enters the aperture value Svo established by the automatic electronic flash unit and the value Avo representing the maximum aperture of the photographic lens. This is done in such a manner that the needle 37a of the meter 37 assumes a position corresponding to the sum of the values Svo and Avo. As a result, the scale plate 13 and the needle 37a display the proper aperture value in the viewfinder.

Use of an interchangeable lens employing the absolute value system can be understood by reference to FIGS. 4 and 10. Here, while taking a daylight photograph, the values Avo and Avc of the pin 1 are transmitted to the lever 6 through the levers 4 and 62 which are connected to each other by the spring 61. The lever 106 now rotates clockwise around the shaft 108 so that one end 106a of the lever 106 pushes the end 20a of the lever 20. This lever rotates counterclockwise around the shaft 21 and transmits the values Avo and Avc to the meter in accordance with the aforementioned embodiment. The aperture scale plate 13 indicates the absolute aperture value while the value Avo is entered in the meter so that the needle 37a and the aperture scale plate 13 indicate the correct aperture value.

When the eyepiece shutter operating knob 112 is set at the index 113 (i.e. a mark on the knob is set to the index 113) the camera is ready for flash operation. The lever 114 rotates clockwise and causes the pin 115 to move the armature a of the switch $SW_2$ to the terminal c. This connects the resistance R representing the value Svo of the aperture set for the electronic flash unit to the meter 37.

At the same time, while the lever 114 rotates the clockwise, the lever 106 rotates counterclockwise around the shaft 108 by virtue of the pin 118 provided on the lever 106. This disengages the end 106a of the lever 106 from the end 20a of the member 20 and eliminates the values Avo and Avc from the meter 37. As a result, the needle 37a of the meter 37 assumes a position determined by the automatic electronic flash so as to indicate the correct aperture position relative to the scale plate 13. The operation after this is the same as that for taking a picture with an interchangeable lens of the step number system.

Figure 11:
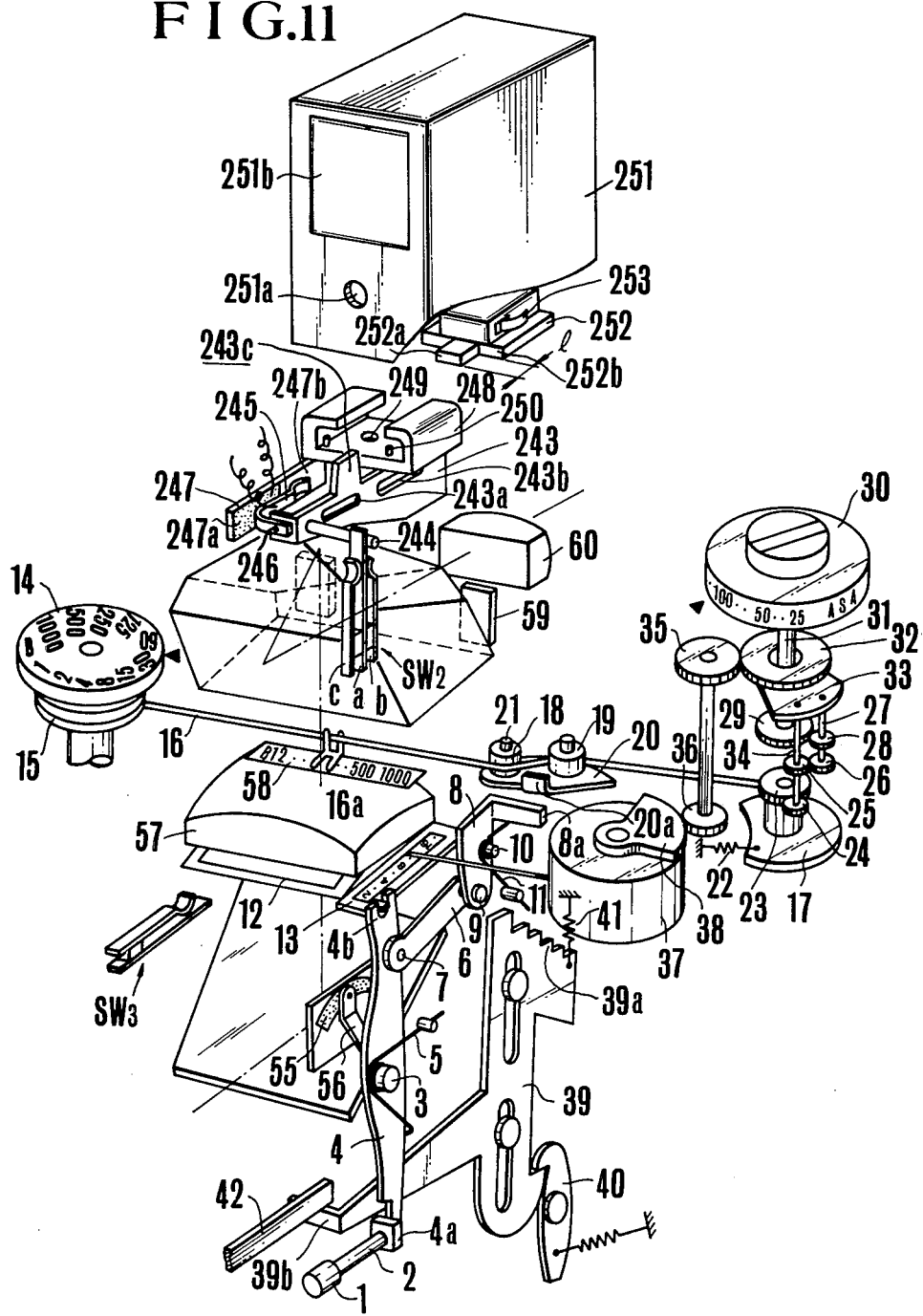
FIG. 11 is an exploded view illustrating still another camera embodying features of the invention.

FIGS. 11 to 14 illustrate another embodiment of the invention. Here, like reference characters also represent like structure. In FIG. 11, a lever 243 contains guide grooves 243a and 243b as well as upstanding extension 243c. A pin 244 extends from the lever 243 to open and close the switch $SW_2$. A slide 245 extending from the lever 243 by means of a pin 246 slides over a resistance 247a and an insulating portion 247b on a printed plate 247. A shoe 248 on the camera body receives the electronic flash unit. A synchronizing contact terminal 249 is mounted on the shoe 248. A stopper pin 250 engages a face 252b after mounting of the flash unit. A flash unit 251 includes a flash emitting portion 251b and a light senser 251a as well as a mounting plate 252 having a projection 252a.

A synchronizing contact terminal 253 on the side of the flash unit electrically contacts the aforementioned synchronizing terminal 249 when the flash unit is mounted. A synchronizing switch $SW_3$ is closed when the front shutter curtain of the shutter mechanism (not shown) is totally opened.

Figure 12:
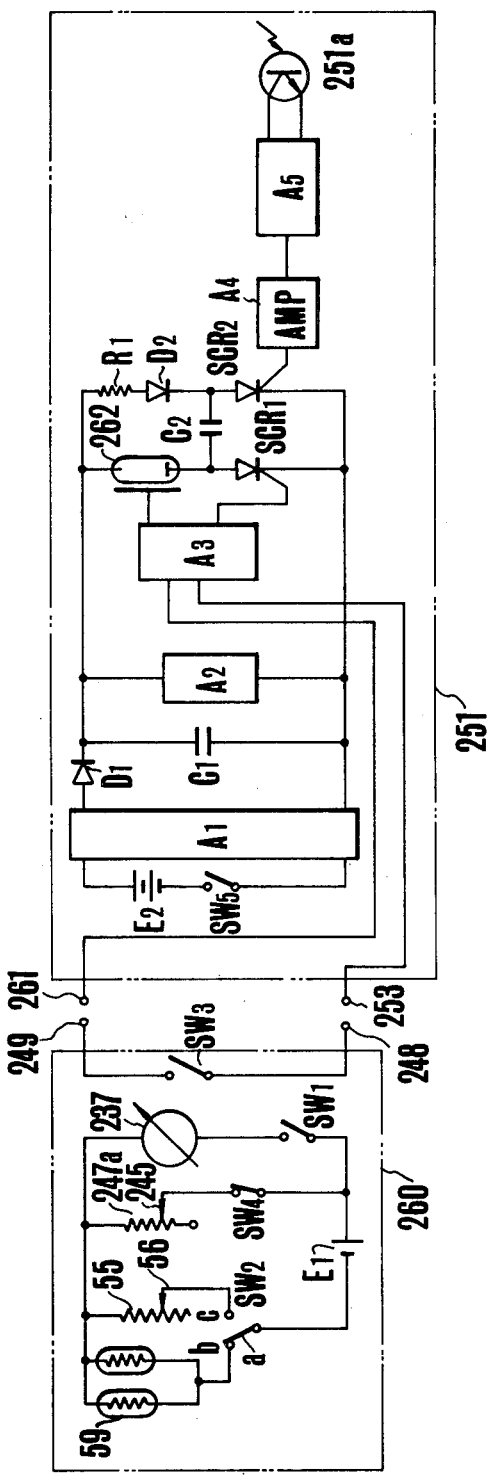
FIG. 12 illustrates an electrical circuit diagram for the camera shown in FIG. 11.

The diaphragm control circuit of the structure in FIG. 11 is shown in FIG. 12. Here a camera body 260 includes a current source $E_1$, a current source switch $SW_1$, and a selector switch $SW_2$ having terminals b and c and an armature a.

The resistance 55 which compensates for the maximum aperture value Avo during flash operation as well as the value Avc and enters the aperture value $Svo_1$ established by the electronic flash unit has its slider 56 connected to the terminal c. The resistance 247a introduces several kinds of values Svon different from the aperture value established by the automatic flash unit and appearing in the resistance 55. The switch $SW_4$ is composed of the printed plate 247 and the slide member 245. It is open for daylight operation when the flash unit which establishes the aperture value $Svo_1$ is mounted on the camera. The switch $SW_4$ is closed when the flash unit establishing the other aperture value Svon is mounted on the camera to control the needle 37a of the meter 37 in accordance with the latter value. The synchronization contact terminals 248 and 249 on the camera contact terminals 252 and 261 on the flash unit.

The flash unit includes a circuit 251 wherein a main switch $SW_5$ connects a current source $E_2$ to energize the circuit. A voltage step-up circuit $A_1$ energizes a main capacitor $C_1$ through a diode $D_1$. The network 251 includes an indication circuit $A_1$, and a trigger $A_3$ for producing trigger pulses which render a discharge tube 262 and a control rectifier $SCR_1$ conductive when the synchronization switch $SW_2$ is closed. A light sensing element such as a phototransistor 251a measures the amount of light reflected from an object to be photographed. An integrating circuit integrates the output of the light sensing element 251a and an amplifier $A_4$ amplifies it.

In operation, the flash unit is not normally mounted for taking daylight photographs. Hence the armature a of the switch $SW_2$ is connected to the terminal b. The light sensing element 59 is connected to the meter 37. The output of the light sensing element 59 is applied to the meter 37 so that the position of the needle 37a of the meter 37 corresponds to the amount of light from the object to be photographed as well as the maximum aperture value F etc. When the automatic flash unit is mounted on the camera taking a flash photograph, the shutter speed and the film sensitivity are entered in the same way as for daylight operation. Mounting of the device 51 on the shoe 248 in this photographic mode causes the member 252 to push the upstanding member 243c of the lever 243 and advance the pin 244. This connects the armature a of the switch $SW_2$ to contact the terminal c and connects the resistance 55 to the meter 237.

The length 1 of the projection 252a of the shoe is adjusted so that the slide member 254 does not contact the resistance 247a. The switch $SW_4$ thus remains open and the value Avc introduced by rotation of the meter 237 is cancelled by the resistance 55 while the aperture value $Svo_1$ established by the flash unit and the maximum aperture value Avo of the lens are entered in the meter 37 through the resistance 55. Hence the needle 37a of the meter 37 assumes a position corresponding to the sum of the values Svo and Avo. In this way the correct aperture value is displayed in the viewfinder by the needle 37a with respect to the scale plate 13.

When the shutter button is depressed, the diaphragm of the lens is adjusted in accordance with the position of the needle 37a of the meter 37 as in daylight photography. The synchronizing switch $SW_3$ is closed. The trigger circuit $A_3$ now triggers the rectifier $SCR_1$ and the discharge tube 262. This discharges the capacitor $C_1$ through the tube 262 and $SCR_1$ to produce a flash. The light reflected from the object to be photographed reaches the light sensing element 251a whose output is integrated in the integrating detecting circuit $A_5$ and transmitted to the gate of control rectifier $SCR_2$ through the amplifier $A_4$. This turns on the rectifier $SCR_2$.

The charge in a commutating capacitor $C_2$ is connected by the rectifier $SCR_2$ to inversely bias the anode and cathode of the rectifier $SCR_1$ and switch off the latter. This terminates the discharge of the tube 262 to produce a proper exposure.

As explained above, while taking a flash photograph the maximum aperture value F is removed from the diaphragm control circuit so that the aperture value is properly set. When a flash whose aperture value is different from the aperture value established by the automatic electronic flash unit is mounted, the slide member 245 is set on the resistance 247a in accordance with the altered length 1 of the member 252a. This closes the switch $SW_4$ and the resistance 247a is connected to the meter 37 in such a manner that the position of the needle in the meter compensates for the aperture value $Svo_1$ by the difference. Thus the proper aperture value is automatically set even in this case.

Figure 13:
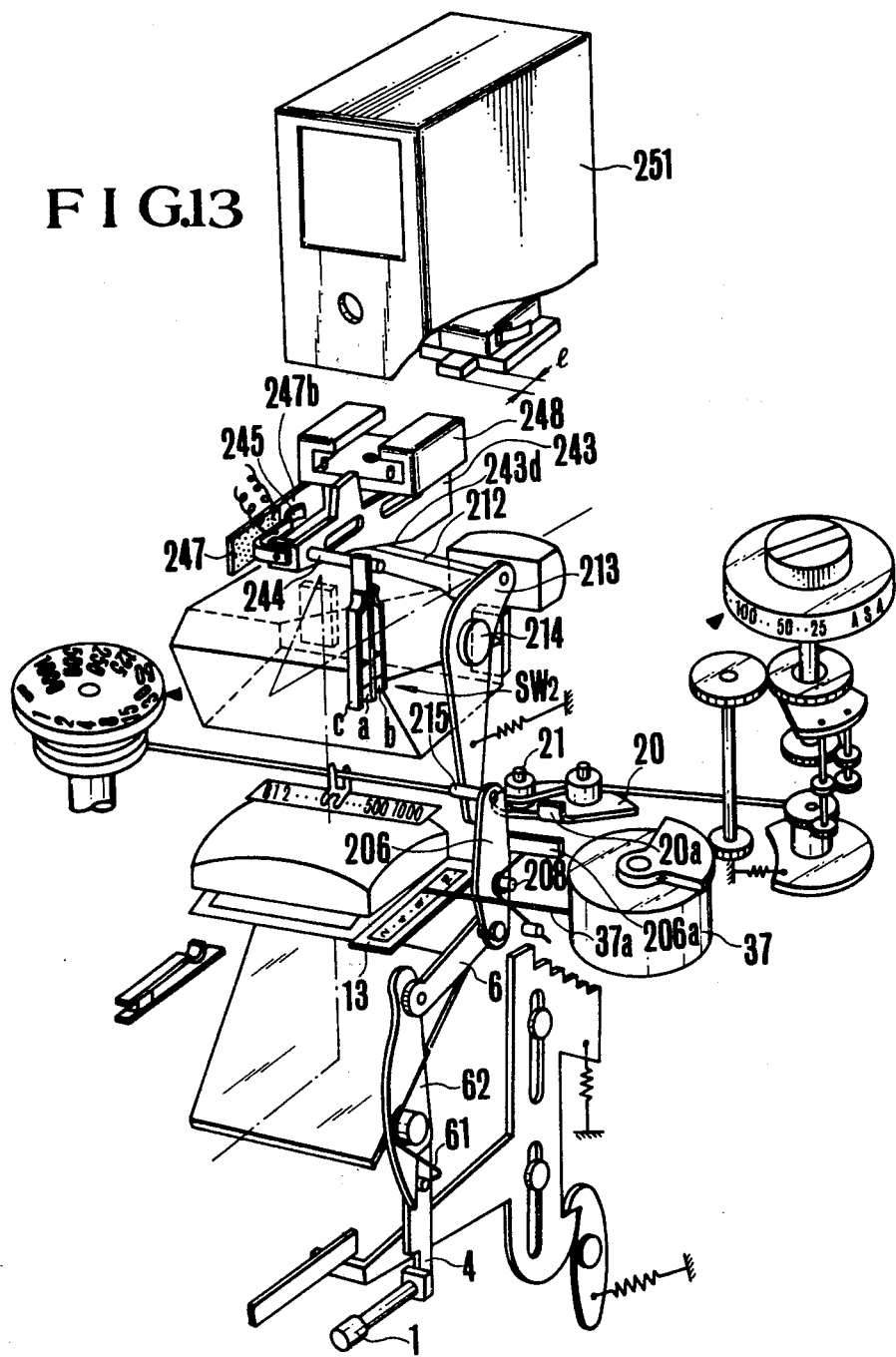
FIG. 13 illustrates a variation of the camera shown in FIG. 11.
Figure 14:
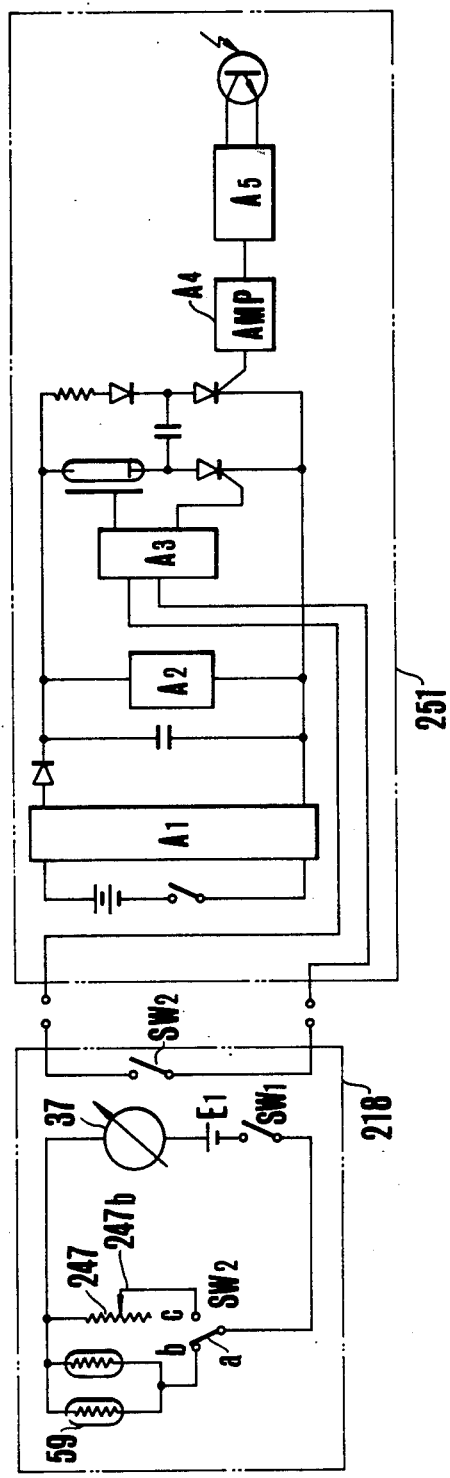
FIG. 14 illustrates the electrical circuit diagram of the camera shown in FIG. 13.

Operation when mounting an interchangeable lens employing the absolute value system is disclosed in FIGS. 13 and 14. During daylight operation, the values Avo and Avc are transmitted to the lever 6 by means of the compensating pin 1 indicating the maximum aperture value F. Transmission occurs through the levers 4 and 62 which are connected to each other by means of a spring 61 so that the lever 6 rotates clockwise around the shaft 208. One end 6a of the lever 6 pushes one end 20a of the lever 20. Hence the lever rotates counterclockwise around the shaft 21 so that the values Avo and Avc are transmitted to the meter 37 in accordance with the prior embodiments.

On the other hand, the absolute value of the aperture appears on the aperture scale plate 13 while the value Avo appears in the meter needle 37a. Hence the aperture value on the aperture scale plate displays the correct value.

When taking a flash photograph, the unit 251 is mounted on the shoe 248. The lever 243 is thus moved forward and the pin 244 engages the armature a of the switch $SW_2$. This switches the armature to the terminal c while the slide member 245 engages resistance 247. Hence the resistance 247 representing the aperture for setting the automatic flash unit is connected with the meter 37 in FIG. 4. On the other hand, clockwise rotation of the lever 213 rotates the lever 206 counterclockwise around the shaft 208 by means of the pin 215 on the lever 206. Hence, end 206a of the lever 206 and end 207a of the lever 207 are disengaged and Avo and Avc are erased from the meter 207. The needle 37a now assumes a position established by the flash unit and displays the correct value relative to the plate 13. The operation is now the same as for that with an interchangeable lens employing the step number system.

Figure 15:
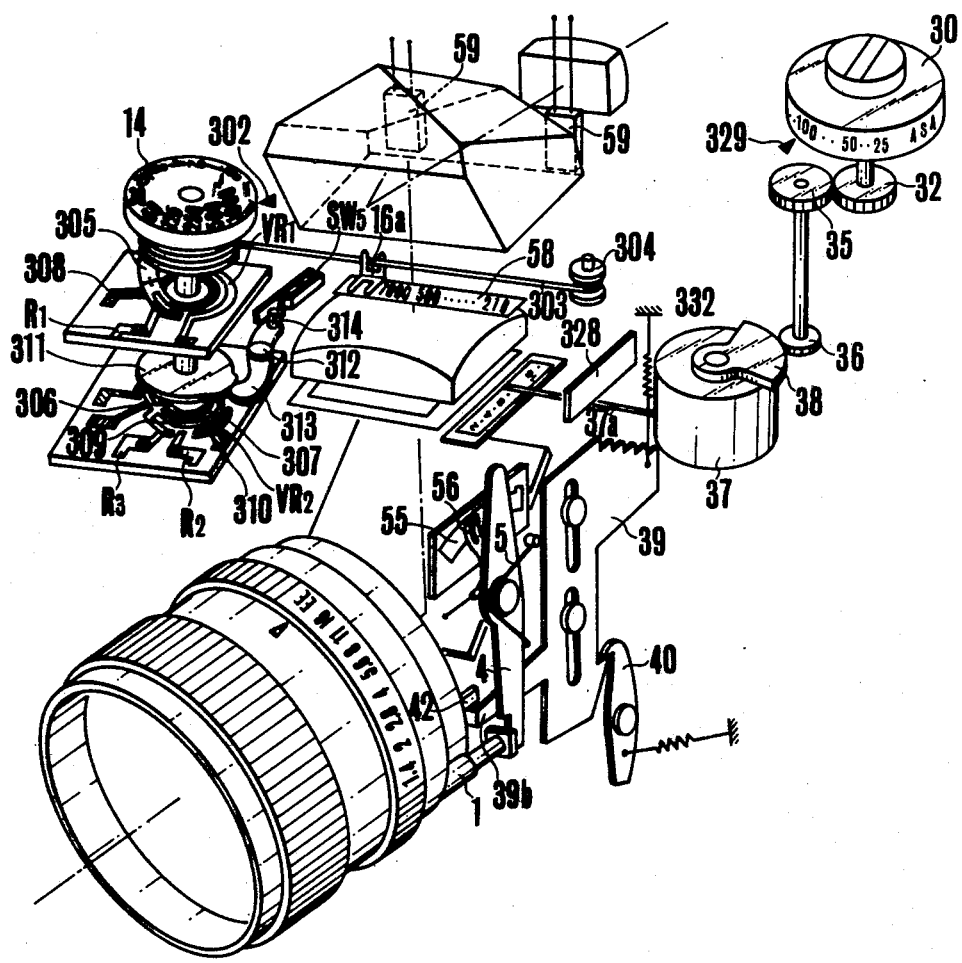
FIG. 15 illustrates another embodiment of the camera according to the present invention.
Figure 16:
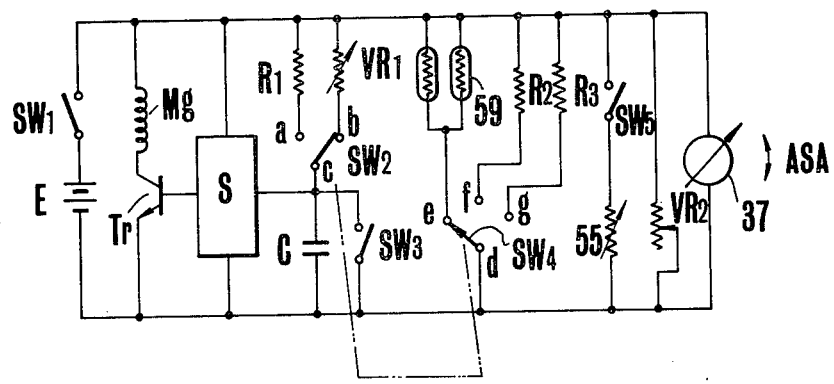
FIG. 16 illustrates the electrical circuit diagram of the camera shown in FIG. 15.

FIGS. 15 and 16 disclose another embodiment of the invention. Here, the maximum aperture value F can be introduced or eliminated from the diaphragm control device on the basis of the position of the shutter dial. In daylight operation, the indications 1 to 1,000 of the shutter dial 14 are set at the index 302 so as to set the shutter speed. One end of the brush 305 moving coaxially with the shutter dial 14 slides over the slide resistance $VR_1$ and the other end over the conductive portion 308. At the same time one end of the foot of the brush 306 slides over the conductive portion 307 and the shutter speed resistance $VR_2$. One end of the foot of the brush slides over the portion 307 and the other of the conductive portion 310 so that in FIG. 16 switch $SW_2$ is closed by way of contacts c,b while the value $VR_1$ is set by setting of the dial 14. The conductive parts 307 and 310 are respectively short circuited by the brush 309 so that switch $SW_4$ assumes a position wherein the contacts d and e are connected. This in turn connects the light sensing element 59 into the circuit.

In this state, the cam surface of the cam plate 311 coaxial with the dial 14 assumes a lower position than the lever 313 rotatable about the shaft 312 while the pin 314 on the lever 313 assumes a position away from switch $SW_5$. Therefore, the switch $SW_5$ remains on. Hence, in FIG. 16, the resistance 55 representing the maximum aperture value Avo and the value Avc is connected parallel to the meter 37. The wire 303 wound up on a pulley coaxial to the dial 14 is also wound about a pulley 304 and a shutter indicating member moves with the wire 303 relative to the plate 58 on the basis of the rotation of the shutter dial 14.

The information values Avo and Avc of the lens are introduced by means of the information pin 1 which rotates the lever 4 counterclockwise against the force of the spring 5. The brush on the lever 4 now slides over the resistance 55 so as to introduce values Avo and Avc to the exposure control mechanism.

Setting the film sensitivity at the index 329 by rotating the film sensitivity setting dial 30 causes the film sensitivity to be transmitted to the meter 37 through the gears 32, 35, and 36 and the gear fixed on the case of the meter 37. When the main switch SW1 in FIG. 16 is now closed, the resistances 55, $VR_2$, and 59 are now connected in parallel. The operation now responds to the photoelement 59, the shutter speed value $VR_2$, the film sensitivity data, and the values Avo and Avc in such a manner that the needle 37a of the meter 37 indicates that aperture value. At this point, the shutter release causes the sawteeth 39 to be disengaged from the lever 40 so that the spring 332 slides the sawteeth 39 upwardly until the needle 37 is clamped by the clamping plate 328. The movement of the sawteeth 39 causes one end 39b to rotate the diaphragm preset ring lever 42 and set the diaphragm at the preset position. At the same time, the front shutter curtain start to run and switch $SW_3$ opens. A time constant circuit composed of resistor $VR_1$ and capacitor C functions and operates the switching circuit. Transistor TR is now switched on and current runs through the electromagnet Mg to release the rear shutter curtain and close the shutter.

For flash operation, an automatic light-adjusting flash unit is used. Within the flash, it is necessary to set the aperture information to be used on the basis of the film sensitivity at a predetermined value independent of the difference of the maximum aperture values of the interchangeable lenses. Thus it becomes necessary that the photoelement 59 be replaced with a resistance R so as to arrive at the set aperture value established by the flash unit when taking a flash photograph and so that the values Avo and Avc are eliminated from the diaphragm control circuit.

For taking a flash photograph the mark on the shutter dial 14 is set at the index 102. This moves one end of the brush 305 to set it at the resistor $R_1$ and thereby set the shutter speed at the synchronizing speed, for example, 1/60th of a second. On the other hand, one end of the brush contacts the resistor $R_3$ when the shutter dial 14 is set at H while this end contacts the resistor $R_2$ when the dial 14 is set at L. As a result, selection is possible in accordance with the set aperture information of the automatic light adjusting flash unit.

The lever 313 engages the cam plate 311 at a high point so that the lever 313 rotates arounds the shaft 312 counterclockwise to open switch $SW_5$. When the latter is opened, the resistor 55 whose value corresponds to Avo and Avc is taken out of the aperture determining circuit. Thus now it is possible to introduce the set aperture information for the flash unit even when an interchangeable lens with a different maximum aperture value is used.

When the shutter is released in the aforementioned state, the sawtooth 39 clamps the needle 37a and the lens diaphragm preset ring lever 42 is rotated so as to preset the aperture value as in daylight photography. On the other hand, switch $SW_3$ is open in synchronism with the start of the front shutter plane in such a manner that the time constant members $R_1$ and C set the shutter speed, such as 1/60th of a second. The switching circuit then turns on the transistor Tr. Current runs through the magnet Mg which releases the rear shutter plane and hence controls the shutter speed at a proper value. This results in a correct exposure.

Figure 17:
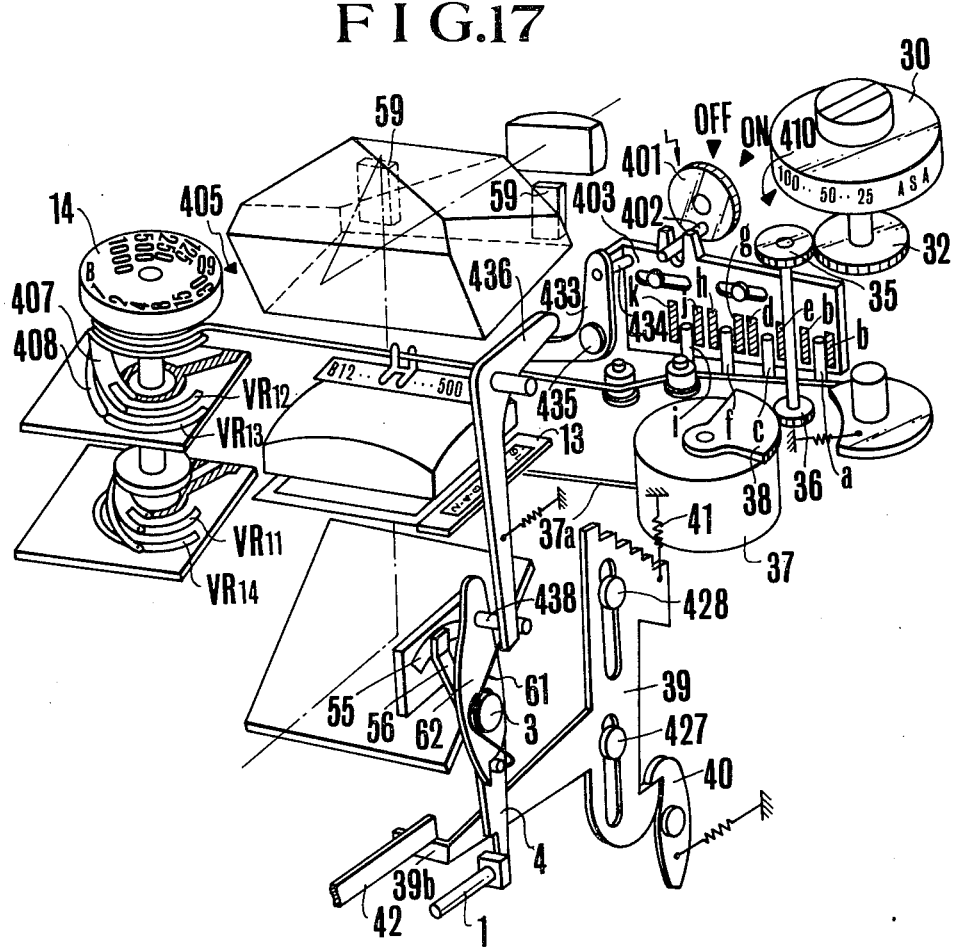
FIG. 17 illustrates still another embodiment of the camera in accordance with the present invention.

A sixth embodiment of the present invention is illustrated in FIGS. 17 and 18. Here, the maximum aperture data Avo is introduced into or eliminated from the control device by the operating member of the current switch. When the knob 401 of the main switch is changed from the position "OFF" to the position "ON", the pin 402 on the knob 401 moves the slider 403 to the left. This closes the switch $SW_1$. It also switches the movable contact member C of the switch $SW_2$ to the contact e, and switches the contact member f of the switch $SW_4$ to the contact g. Moreover, the movable contact member i of the switch $SW_5$ is switched to the contact j. If now, the shutter speed dial 14 is set to the index 405, the brushes 407 and 408 rotated by the shutter speed dial 14 slide over resistors $VR_{12}$ and $VR_{13}$. Thus the resistances $VR_{12}$ and $VR_{13}$ assume values corresponding to the shutter speed.

On the other hand, when the film sensitivity set dial 30 is set relative to the index 410, the meter 30 is rotated by the gears 32, 35, 36, and 38. This enters the film sensitivity into the meter 37.

Vignetting causes another erro in the measurement. A difference of one step between the maximum apertures of the interchangeable lenses produces outputs in the photoelectric element 59 whose difference do not correspond to the difference between the maximum aperture values. The larger the maximum aperture, the brighter the interchangeable lens, and the larger the vignetting error. Under these circumstances, it is necessary to compensate for this error in order to obtain a proper exposure.

With interchangeable lenses employing an absolute value aperture adjusting system, the error due to the difference between the maximum aperture values is introduced into the exposure control mechanism. Consequently, the compensating pin 1 introduces compensating information into the exposure control mechanism.

A photographer lens may carry the pin 1 whose length corresponds to the maximum aperture value Avo of the photographic lens as well as vignetting compensating data Avc. When such a lens is mounted on the camera, the lever 4 rotates counterclockwise around the shaft 3. The lever 62 is connected with the lever 4 by means of the spring 61. In consequence, rotation of the lever 4 causes counterclockwise rotation of the lever 62. Thus, the brush 56 mounted on the lever 62 slides over the resistance 55. The resistance 55 assumes a value corresponding to the aforementioned values Avo and Avc. The needle 37a of the meter 37 thus indicates an aperture value corresponding to the value of the resistance of the photoelectric element 59, the resistance $VR_3$, Avo, Avc, and the film sensitivity. When the release button is depressed, the lever 40 rotates clockwise to release the sawteeth 39. The spring 41 causes upward movement of the sawteeth 39 which is guided by the grooves 427 and 428. The upward movement continues until the sawteeth 39 engage the needle 37a of the meter 37 and stop. Movement of the sawteeth 39 moves the arm 39b at one end of the sawteeth 39 and rotates the preset ring lever 42 of the lens. This sets the aperture value of the diaphragm preset ring not shown in the drawing.

Further depression of the release button sets the aperture value into the photographic lens. Moreover, depressing the release button causes the front shutter plane to run in the conventional manner so as to start the exposure and also opens the switch $SW_3$ connected in parallel to the capacitor C. This causes the latter to charge through the resistor $VR_{12}$. After an elapse of time corresponding to the time constant determined by the resistor $VR_{12}$ and the capacitor C, the voltage of the charge of the capacitor C reaches a predetermined voltage. This reverses the switching circuit S so that the transistor TR is turned on and an exciting current runs through the magnet Mg. This disengages the holding member of the rear shutter curtain from the rear shutter curtain and the latter starts to run to terminate the exposure.

For flash operation, the main knob 401 is changed from the index "ON" to the position marked with the zig-zag arrow. The pin 402 slides the slider to the right. As a result, the switch $S_1$ is closed, the movable contact member c of the switch $SW_2$ is switched to the contact d, the movable contact member f of the switch $SW_4$ slides to the contact k and the movable contact member i of the switch $SW_5$ moves to the contact h.

When the knob 401 moves the slider 403 to the right, a projecting portion 403a of the slider 403 pushes the pin 434 on the lever 433. This rotates the lever 433 clockwise around a shaft 435, and a lever 436 rotates counterclockwise. Now the lever 62 rotates clockwise against the force of the spring 61. Hence, the brush 56 on the lever 62 slides over the resistance 55 until the value of the resistance 55 is infinite. This eliminates the values Avo and Avc from the exposure control circuit.

On the other hand, the contact member f of the switch $SW_4$ is connected to the contact h. This replaces the photoelectric element $R_x$ with the resistance R and introduces the set aperture information of the automatic light adjusting flash unit into the exposure control circuit.

The resistor $VR_{11}$ is a slide resistance forming part of a time constant circuit. The resistance $VR_{11}$ is variable and controls the time constant determined by $VR_{11}$ and capacitor C when the shutter speed dial is set between 1 and 1/60th or 125th of a second. At the same time it is constructed not to produce a shorter shutter time when the shutter dial 14 is set at speeds faster than 1/60th of a second or 125th of a second.

The resistance $VR_4$ also applies the shutter speed information in the exposure control circuit when the shutter speed dial is set from 1 to 160th or 125th of a second and to set the shutter speed at 1/60th or 125th of a second into the exposure control circuit when the shutter speed dial is set at shutter speeds faster than 1/60th of a second or 125th of a second.

Because of the above construction, the exposure control circuit operates so that a proper exposure can be controlled even during a flash photograph on the basis of the aperture set resistance of the flash unit, the shutter speed information $VR_{14}$ and the film sensitivity data. The aperture output is entered at the needle 37a of the meter 37 in such a manner that the needle 37a assumes a correct position for the aperture scale of the aperture scale plate 13. This rotates the lens diaphragm preset ring lever 42 in the same way as for daylight operation so as to close the diaphragm to the preset position.

The switch $SW_3$ is arranged to open with the start of movement of the front shutter curtain. Hence the switching circuit is operated by the integrating circuit composed of members $VR_{11}$ and C. This operates in such a manner that the then set shutter speed is controlled when it is 1 to 1/60th of a second or 125th of a second and the shutter speed of 1/60th of a second or 125th of a second is utilized when the set shutter speed exceeds, 1/60th of a second or 125th of a second.

FIG. 19 shows an electronic shutter control device suitable for cameras of the present invention. The electronic shutter operates with the shutter speed set while taking a daylight photograph. During flash operation the electronic shutter operates at the set shutter speed only when the set shutter speed is within a predetermined range. It operates with the respective upper or low limits of the shutter speed when the then-set shutter speed is respectively above the upper limit or below the lower limit of the predetermined range so as thereby to obtain a proper exposure for flash operation.

In FIG. 19, an illuminating diode 501 indicates completion of the mounting or the charging of the flash unit. When no completion signal exists for mounting or charging of the flash unit, a switching transistor 509 is switched on. When a completion signal exists and the shutter time is set from 1/125th to 1/1000th of a second or from one-half second to B, switching transistors 504, 508 and 506 or 507 are turned on.

Moreover, transistors 504 and 509 are biased to switch on when the completion signal exists and the shutter time is set from 1/60th of a second to one-fourth of a second. Resistors 502, 503, and 510 to 517 bias the transistors. A resistor 518 sets the high shutter speed limit and a resistor 519 sets the low shutter speed limit. A resistor 520 sets the shutter time and switches $S_{11}$ and $S_{12}$ are selector switches engaging the shutter dial as shown in FIG. 20.

Figure 20:
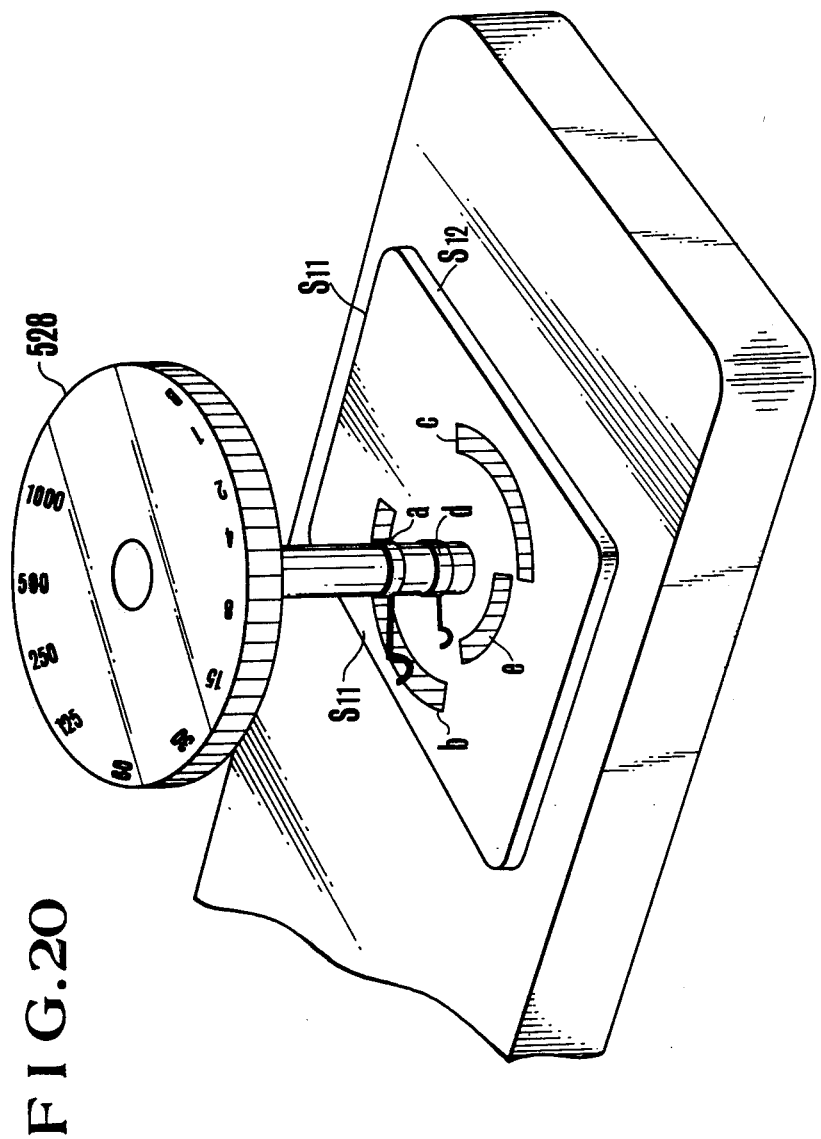
FIG. 20 illustrates the relationship between the switch and the shutter dial of the camera shown in FIG. 19.

In FIG. 20, the contacts a and b of the switch $s_{11}$ are connected to each other when the shutter time is set higher than 1/60th of a second. The contacts a and c are connected to each other when the shutter time is set lower than one-fourth of a second. The contact d and e of the switch $S_2$ are connected to each other when the shutter time is set from 1/60th of a second to one-fourth of a second.

A capacitor 521 forms the time constant circuits with the resistors 518, 519, and 520. An electromagnet 524 controls the shutters and resonants with a capacitor 525 which eliminates the residual magnetism of the electromagnet 524. The current is supplied by a source 526 passing through a power switch 527. A shutter dial 528 sets the shutter speed in FIG. 20. Switch $S_{11}$ of FIG. 19 is supplied with contacts a, b, and c, as shown in FIG.

20, while switch $S_{12}$ of FIG. 19 is supplied contacts d and e of FIG. 20.

In operation, suppose that the high speed limit, namely the limit shutter time suitable for flash photography is 1/60th of a second and the limit for hand held photography is one-fourth of a second. When the shutter dial 128 is set at a faster shutter speed than 1/60th of a second, the contacts a and b of the selector switch $S_{11}$ are connected to each other. If the flash unit is mounted on the camera in this condition, the completion signal upon mounting of the flash unit or of charging of the flash unit, reaches the terminal a. The illuminating diode 501 then lights up to indicate mounting completion or charging of the flash unit.

The mounting or charging completion signal of the flash unit produces a voltage drop in the resistor 502 so that the transistor 504 is turned on. Hence the potential difference between the base and emitter of transistors 505, 506, and 508 increase and these transistors are turned on. Turning on of transistor 508 turns off transistor 509. Consequently, a current runs through the time constant capacitor 521 through the transistor 506 and the resistor 518 when the trigger switch 522 is turned off in response to shutter release. This charge capacitor 521. Hence the shutter time is determined by the time constant of the resistor 518 and the capacitor 521. The resistor 518 is set to produce a shutter speed of 1/60th of a second regardless of the faster speeds set by the shutter dial. After the elapse of 1/60 of a second from the shutter release, the trigger circuit 523 causes the electromagnet 524 to close the shutter.

When the shutter time is set slower than one-fourth of a second in the shutter dial 528, the contact a and c of the selector switch $S_{11}$ are connected to each other. If a flash unit is mounted on the camera in this condition, the mounting recharging completion signal reaches the terminal a and the illuminating diode lights up to indicate completion. Transistors 504, 505, 507, and 508 are now switched on while the transistor 509 is now switched off. Consequently, a current runs through the transistor 507 as well as the time constant capacitor 521 and the resistor 519 when the trigger switch 522 is opened by the shutter release mechanism. The capacitor 521 is charged on the basis of the time constant of the capacitor and the resistor 519. Upon charging the trigger 523 causes the electromagnet 524 to release the rear shutter curtain and terminate the exposure. The value of resistor 519 is selected to produce a shutter time of one-fourth of a second. Thus the shutter operates at one-fourth of a second regardless slower times set into the shutter dial.

When the shutter time is set from one-fourth of a second to 1/60th of a second, the switch $S_{12}$ is closed and the contacts e and d are connected to each other so that the switch $S_{11}$ remains open. In this condition, when the flash unit is mounted on the camera, the illuminating diode 501 lights up in response to the completion signal indicating the mounting or charging of the flash unit in the same way as discussed. This turns on transistor 504 while transistor 505 remains off because the base of the transistor 505 is grounded through the switch $S_{12}$. Thus the transistor 508 is switched off while the potential of the base of transistor 509 goes down so that the transistor 509 turns on.

When the trigger switch 521 is opened in response to shutter release, a current runs through transistor 509 and the resistor 520 as well as the capacitor 521. The capacitor 521 is charged on the basis of the value of the resistor 520 and causes the trigger of 523 to actuate the electromagnet 524 which closes the shutter. The value of resistor is set functionally by the shutter dial so that when the shutter time is set from 1/60th of a second to one-fourth of a second, the set shutter time is obtained.

When no flash is mounted on the camera, no signal reaches terminal a. Thus the base potential of transistor 504 is grounded and the transistors 505 to 508 are switched off while the transistor 509 is on. Therefore, the shutter time is controlled by the value of capacitor 521 and resistance of resistor 520. Hence the shutter operates at the shutter speed set in the shutter dial.

Figure 21:
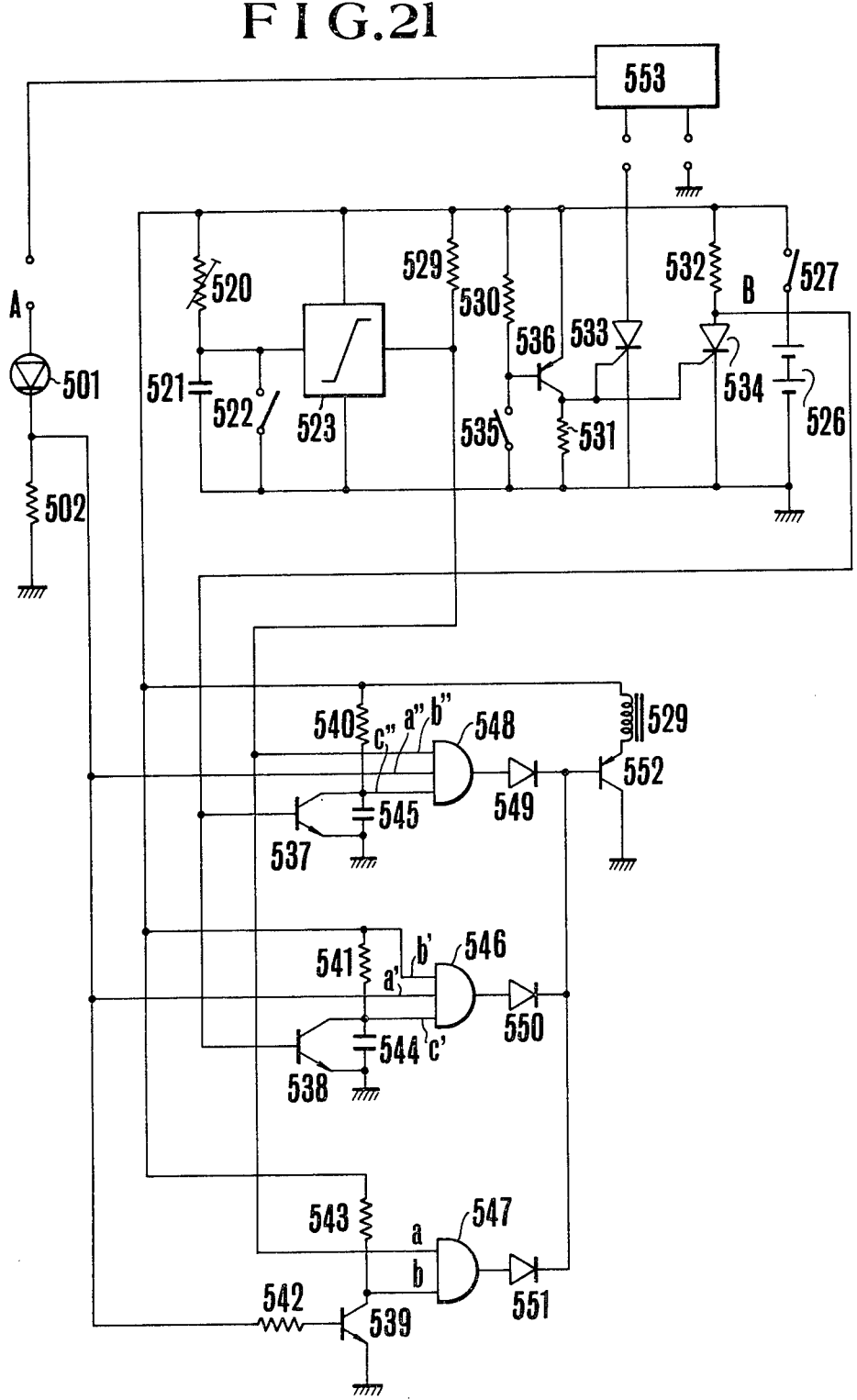
FIG. 21 illustrates another embodiment of the electrical circuit shown in FIG. 19.

FIG. 21 shows the electric circuit diagram of an embodiment in which a determinant circuit determines whether the shutter time set in advance is in the range suitable for flash photography and the shutter time is automatically set for flash operation. In FIG. 21, circuit members performing the same functions as those in FIG. 19 are designated with like reference characters.

In FIG. 21, an AND circuit 547 serves for ordinary photography. Here, one input terminal a is connected to the output terminal of a trigger circuit corresponding to a conventional electronic shutter circuit. The other input terminal b of the AND gate 547 is connected to the collector of transistor 539. The latter is switched on by the mounting or completion signal of the flash device so as to produce an output after shutter release. The AND gate produces an output after shutter release with the output of the trigger circuit when the flash unit is mounted on the camera.

A low speed AND circuit 546 includes an input terminal a' which receives the flash unit mounting recharging completion signal and a second input terminal b' for receiving a current source voltage. The AND gate 546 includes a third input contact c' connected to the output terminal of the low speed limit time circuit composed of the resistor 541 and the capacitor 544. The AND gate 546 produces an output one-fourth of a second after the synchronization contact 535 is closed.

A high speed limiting AND circuit 548 includes a first input contact a" that receives the flash unit mounting or charging completion signal. A second input contact b" connects with the output terminal of a trigger circuit for the conventional electronic shutter. A third input contact c" connects to the output terminal of the high speed limiting time constant composed of resistor 540 and condenser 545. The aforementioned AND circuit produces the output after the elapse of 1/60th of a second or the time set in advance after synchronization contact 535 is closed by shutter release.

Resistors 530 and 531 cooperate with a transistor 536 which is turned on upon closure of the synchronizing switch 535. The transistor 536 applies a control signal to the gate of thyristors 533 and 534 so as to turn them on. Thyristor 534 draws a current through a resistor 532.

Transistors 537 and 538 are switched off simultaneously in response to conduction of thyristor 534. This actuates the time constants circuits composed of capacitors 544 and 545 as well as resistors 541 and 540. Diodes 549 to 551 connect the AND gates 546 to 548 to the base of the transistor 552. The transistor 552 is turned off by the outputs of the above-mentioned AND circuits 546 to 548 so as to end the excitation of the electromagnet 529. A conventional flash unit 553 is connected to the system as shown.

In operation, when no flash unit is mounted on the camera, the potential at the point a is ground. Hence, no input signal exits at the input terminals a' and a" of the AND circuits 546 and 548. Under these circumstances, the AND circuits are disabled. On the other hand, the transistor 539 is switched off. Hence, the voltage at the current source is applied to the input of the contact b of the AND circuit 547 when the current source switch 527 is closed.

When the trigger switch 522 is opened by movement of the front shutter curtain in response to shutter release, a current passes through capacitor 521 through the resistor 520. This charges the capacitor 521. When the capacitor 521 is charged to a predetermined potential, the trigger circuit 523 operates. The potential at the output terminal is that of the current source. The resistor 520 has a value such as to correspond to the shutter time set by the shutter dial not shown in the drawing. Hence the time before operation of the trigger circuit 523 is equal to the shutter time set in advance.

When the potential at the output of the trigger circuit 523 reaches that of the current source as mentioned above, the potential is transmitted to the input contact a of the AND circuit 547. Hence the AND circuit 547 produces an output which is applied to the base of transistor 552. This turns off transistor 552 and deenergizes the electromagnet 524. The rear shutter curtain now starts to run in a conventional manner so as to terminate the exposure.

When no flash unit is mounted on the camera, the shutter operates at the preset shutter time. When the flash unit 553 is mounted on the camera the mounting or charging completion signal of the main capacitor is transmitted to the point a in the conventional manner. This lights the illuminating diode 501 and provides an input signal to the contacts a' and a" of the AND circuits 546 and 548. When the current source switch 526 is closed, the current source voltage is applied to the input contact b' of the AND circuit 546. Moreover, the source voltage is applied between the collector and the emitter of the transistor 539 while the base of transistor 539 is high. This turns on the transistor 539. Consequently, the contact b of the AND circuit is grounded and the AND gate 547 disabled.

Simultaneously with the release of the shutter not shown in the drawing, the trigger switch 522 and the synchronizing switch 535 are respectively opened and closed in response to starting of the front shutter curtain. Therefore, the current source voltage is applied to the input terminal b" of the AND gate 548 when, after elapse of the preset shutter time, the trigger circuit 523 operates as in the aforementioned embodiments. Moreover, an input signal is applied to contacts c' and c" of the AND gates 546 and 548 after an elapse of time determined by the values of resistors 540 and 541. When the synchronization switch 535 is closed, the transistor 536, and the thyristors 533 and 534 are turned on while the transistors 537 and 538 are turned off. Thus, AND circuit 546 is enabled after a time determined by the resistance of the resistor 541.

The resistor 541 is selected to correspond to a shutter speed of one-fourth of a second. Hence the AND circuit 546 always produces an output one-fourth of a second after shutter release.

The AND circuit 548 is enabled after a time determined by one of the resistors 520 and 540 whose resistance is larger than that of the other. The resistor 540 is selected to produce a shutter speed of 1/60th of a second. Hence, when the resistor 520 is set by means of the shutter dial not shown in the drawing so that its resistance corresponds to a shutter time longer than 1/60th of a second, the AND circuit 548 produces an output after the elapse of the preselected shutter speed. When the resistor 520 is set to a value corresponding to a shutter time shorter than 1/60th of a second, the AND circuit 548 produces an output after 1/60th of a second.

Suppose that the shutter time is set shorter than 1/60th of a second by means of the shutter dial not shown in the drawing. Then the input signal is transmitted to the input contact b" of the AND circuit 548. However, this occurs only after the trigger switch 522 is opened and the synchronization switch 535 is closed in response to the release operation of the shutter, and after the preselected shutter time has elapsed. No input signal is applied to the input contact a' so that the AND circuit 548 produces no output.

The value of the resistor 540 is adjusted so as to provide an input signal to the input contact c' 1/60th of a second after the synchronization switch is closed. Hence the AND gate is enabled 1/60th of a second after the synchronization switch is closed. This produces an output that switches off the transistor 522 in such a manner that the electromagnet is no longer excited. The rear shutter plane now starts to run to terminate the exposure.

When the shutter time is set between 1/60th of a second and one-fourth of a second, the input signal is applied to the input contact b" after the elapse of the preselected time between 1/60th of a second and one-fourth of a second. Hence the AND circuit 548 terminates the exposure after the preselected shutter time.

When the shutter time is preset longer than one-fourth of a second, the input signal is applied to the input contact c' of the AND gate 546 one-fourth of a second after the synchronization switch is closed because the resistor 541 is set at a value corresponding to the shutter time of one-fourth of a second. The AND circuit 546 is enabled and produces an output one-fourth of a second after the synchronization switch is closed. This turns on transistor 552. This deexcites the magnet 524. Hence the rear shutter plane starts to run to terminate the exposure.

The circuit of the embodiment shown in FIG. 21 automatically sets the shutter time at a speed suited for flash photography no matter to what speed the shutter is selected.

The aperture value can automatically be set not only for flash but also for daylight at the time the photograph is taken.

Moreover, the maximum aperture is introduced into the exposure control circuit, particularly the diaphragm control circuit, or eliminated from the circuit when taking a flash photograph, so that the aforementioned operation can be carried out by the knob of the main switch without providing any special member in the camera. This makes it possible to produce a compact camera.

What is claimed is:

1. An automatic exposure control device for a single reflex camera on which a speed light device can be mounted or dismounted comprising:
   a body adapted for mounting interchangeable photographic lenses mountable on the body, said photographic lenses including variable diaphragms having respective maximum apertures,
   a means for measuring the light coming through the mounted photographic lens with a diaphragm, a first signal generating means on the mounted lens for generating the maximum aperture value of the mounted interchangeable photographic lens, a diaphragm control means in the body for determining the aperture value of the diaphragm on the basis of the output of the light measuring means as well as the output of the first signal generating means, a connecting means in the body for connecting the above-mentioned diaphragm control means to the first signal generating means, a second signal generating means for generating a signal corresponding to a predetermined aperture value while taking a flash photograph, a selector means coupled to the connecting means for switching diaphragm control means from the first signal generating means to the second signal generating means during setting for flash operation.

2. A camera according to claim 1 further comprising:
a reflex mirror,
said operating means including a mirror lifting operation member for manually operating the reflex mirror.

3. A camera according to claim 1, further comprising;
a shutter control means,
a self-timer for operating the shutter control means after the elapse of a predetermined time, and
an operating member for the self-timer, said operating member serving as the above mentioned operating means.

4. A camera according to claim 1, further comprising;
a view finder for visually recognizing the light coming through the above mentioned photographic lens, said finder including an eye piece lens,
an eye piece shutter of the above mentioned eye piece lens, and
an operating member for the above mentioned eye piece shutter, said operating member serving at the same time as the above mentioned operating means.

5. A camera according to claim 1 further comprising:
a shutter dial for adjusting the set value of the above mentioned setting means, said dial also serving as the operating means.

6. A camera according to claim 1, further comprising;
a current source,
a current source switch for applying the current source voltage to the above mentioned diaphragm control means, and
an operating member for the above mentioned current source switch, said operating member forming the operating means.

7. A single lens reflex camera on which an electronic flash requiring a predetermined aperture value for taking a flash photograph can be mounted or dismounted comprising:
a camera body adapted for mounting a plurality of interchangeable photographic lenses separately mounted on the body, said lenses including variable diaphragms, having respective maximum apertures,
measuring means for measuring the light coming through the mounted lens at the maximum aperture of the diaphragm, and for generating an electric signal corresponding to the amount of light through said maximum aperture,
a shutter time setting means in the body and including a manually settable first setting means capable of being set manually to a shutter time of optional value and a second setting means for setting the shutter time to a time constant, said first and said second setting means each generating an electric signal corresponding to the respective values set, a diaphragm control means in the body for determining the aperture of the diaphragm on the mounted lens corresponding to the output of said light measuring means as well as to the output of said first setting means during day light photography, a compensation means in the body and connected to said diaphragm control means for generating an electric signal corresponding to the maximum aperture of the mounted interchangeable photographic lens as well as to the predetermined aperture value, and for emitting the generated electrical signal to said diaphragm control means during flash photography, a shutter time control means in the body and connected to the shutter for controlling the time of shutter so as to correspond to the value of said first setting means during day light photography, selector means for alternately changing from the daylight photography mode to the flash photography mode, said means connecting said diaphragm control means with said light measuring means and with said first setting means as well as connecting said shutter time control means with said first setting means during day light photography and connecting said diaphragm control means with said compensation means as well as connecting said shutter time control means with said second setting means during flash photography, and an operating means for operating the above mentioned selector means.

8. An automatic exposure control device according to claim 7 in which said changeover means comprises a first changeover means a second changeover means, said first changeover means being adapted to switch the input signal of the diaphragm control means, while the second changeover means being adapted to switch the input signal of the shutter time control means.

9. An automatic exposure control device for a single lens reflex camera on which a flash light device can be mounted or dismounted and on which interchangeable photographic lenses having variable diaphragms with respective maximum apertures can be mounted, comprising:
a measuring means for measuring the light coming through the mounted photographic lens with a maximum aperture and for generating an electric signal corresponding to the amount of light passed through said photographic lens,
a first shutter time setting means for manually setting a shutter time to an optional value and for generating an electric signal corresponding to the set value,
a second shutter time setting means for setting the shutter time to a time constant and for generating an electric signal corresponding to the set value,
a third shutter time setting means for setting the shutter time to a time constant at a speed value lower than the value set by the second shutter time setting means, said third shutter time setting means generating an electric signal corresponding to the set value,
a gate means for producing an output when receiving the output from both of said first shutter time setting means and of said second shutter time setting means, diaphragm control means for determining the diaphragm aperture value corresponding to the output of said light measuring means as well as to the output of said first shutter time setting means at the time of the day light photography, a signal generating means for generating diaphragm value signal to set the diaphragm at a constant aperture value, a shutter time control means, said means being actuated by the output of said first shutter time setting means at the time of the day light photography, and a change over means for alternatively switching between a daylight photography mode to the flash photography mode, said changeover means being adapted to switch said diaphragmcontrol means to be connected with said diaphragm value signal generating means as well as to switch said shutter time control means to be connected with both said gate means and the third shutter time setting means at the time of the flash photography, whereby at the time of flash photography the diaphragm control means actuates to set the diaphragm to a constant openening of the aperture due to the output of said signal generating means, while the shutter time control means is actuated by the alternate output of the gate means or the third shutter time setting means.

* * * * *